(12) United States Patent
Mertens

(10) Patent No.: US 12,192,581 B2
(45) Date of Patent: *Jan. 7, 2025

(54) ONLINE MEDIA BROADCAST SYSTEM AND METHOD

(71) Applicant: Francois-Louis Mertens, Los Angeles, CA (US)

(72) Inventor: Francois-Louis Mertens, Los Angeles, CA (US)

(73) Assignee: TECHNO MIAM LLC, Studio City, CA (US)

( * ) Notice: Subject to any disclaimer, the term of this patent is extended or adjusted under 35 U.S.C. 154(b) by 107 days.

This patent is subject to a terminal disclaimer.

(21) Appl. No.: 17/373,567

(22) Filed: Jul. 12, 2021

(65) Prior Publication Data

US 2022/0038780 A1 Feb. 3, 2022

Related U.S. Application Data

(63) Continuation-in-part of application No. 16/591,497, filed on Oct. 2, 2019, now Pat. No. 11,064,232.

(51) Int. Cl.
*H04N 21/462* (2011.01)
*H04N 21/2187* (2011.01)
*H04N 21/258* (2011.01)
*H04N 21/472* (2011.01)

(52) U.S. Cl.
CPC ..... *H04N 21/4622* (2013.01); *H04N 21/2187* (2013.01); *H04N 21/25866* (2013.01); *H04N 21/47202* (2013.01)

(58) Field of Classification Search
CPC .......... H04N 21/4622; H04N 21/2187; H04N 21/25866; H04N 21/47202
See application file for complete search history.

(56) References Cited

U.S. PATENT DOCUMENTS

| | | | |
|---|---|---|---|
| 11,064,232 B2 * | 7/2021 | Mertens | H04N 21/4223 |
| 2015/0358671 A1 * | 12/2015 | Woodman | H04N 21/4828 725/134 |
| 2018/0152736 A1 * | 5/2018 | Alexander | H04N 21/2665 |
| 2019/0261026 A1 * | 8/2019 | Han | H04N 21/21805 |
| 2019/0273970 A1 * | 9/2019 | Anguiano | H04N 21/23424 |

* cited by examiner

*Primary Examiner* — Kyu Chae
(74) *Attorney, Agent, or Firm* — Cohen IP Law Group, PC; Michael N. Cohen

(57) ABSTRACT

An online broadcasting system is provided. The system combines live video streaming, video on demand (VOD), messaging and other media content provided by an owner of a live broadcast and/or by the owner's online followers. The media content may be combined into a single broadcast stream. The owner of the broadcast may use an online control room to choose in real time what multimedia content to provide to his/her followers. The system also provides for interaction between the followers and interactive elements that the owner may create through the system. A gaming and/or revenue sharing component also may be provided wherein the owner and the followers may earn points for viewing and/or interacting with sponsored media through the system.

10 Claims, 27 Drawing Sheets

FIG. 13

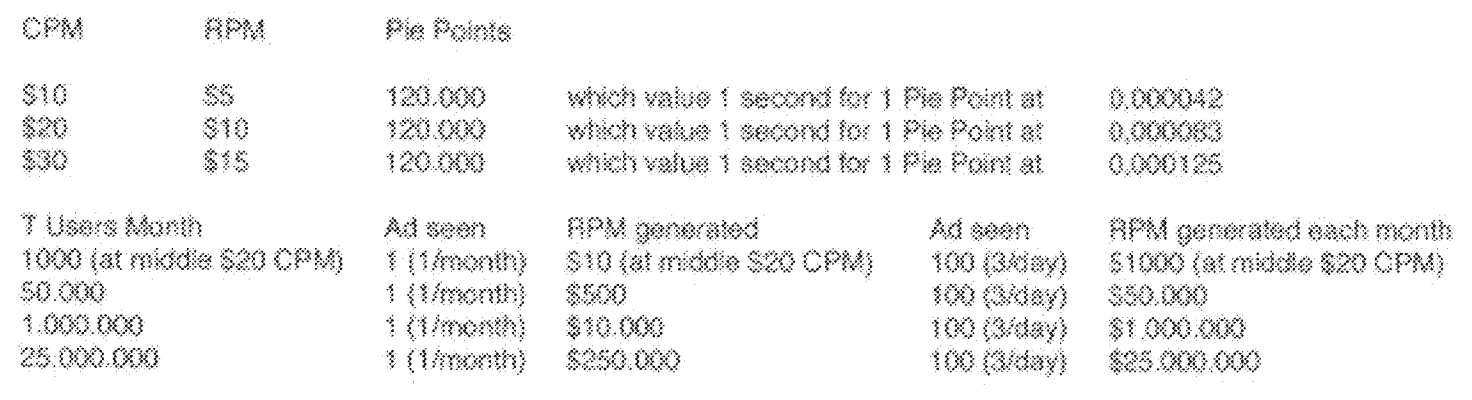

| CPM | RPM | Pie Points | Ad seen | RPM generated | Ad seen | which value 1 second for 1 Pie Point at | RPM generated each month |
|---|---|---|---|---|---|---|---|
| $10 | $5 | 120,000 | 1 (1/month) | $10 (at middle $20 CPM) | 100 (3¢/day) | 0.0000042 | RPM generated each month |
| $20 | $10 | 120,000 | 1 (1/month) | $50 | 100 (3¢/day) | 0.0000083 | $10 (at middle $20 CPM) |
| $30 | $15 | 120,000 | 1 (1/month) | $10,000 | 100 (3¢/day) | 0.0000125 | $50,000 |
| | | | | $2,500,000 | 100 (3¢/day) | | $1,000,000 |
| | | | | | | | $25,000,000 |

T Users Month
1000 (at middle $20 CPM)
50,000
1,000,000
25,000,000

FIG. 14

Figure 1 because making audience and display commercial which personal results? (at middle $20 CPM, 25% U, 25% A, 50% P)

| Audience : User | Ad (1/month) | RPM gen | Pgs Pts | Cash | Ad (3x/day) | RPM gen | Pgs Pts | Cash |
|---|---|---|---|---|---|---|---|---|
| 1,000 | 1 | $5 | 90,000 | $2.5 | 100 | $500 | 3M | $83 |
| 50,000 | 1 | $250 | 1.5M | $125 | 100 | $25,000 | 150M | $12,500 |
| 1,000,000 | 1 | $5,000 | 30M | $2,500 | 100 | $500,000 | 300M | $250,000 |
| 25,000,000 | 1 | $25,000 | 750M | $62,500 | 100 | $12,500,000 | 70K M | $6,250,000 |

CRn

ONLINE MEDIA BROADCAST SYSTEM AND METHOD

CROSS-REFERENCE TO RELATED APPLICATIONS

This application is a Continuation-In-Part of U.S. patent application Ser. No. 16/591,497, filed Oct. 2, 2019, the entire contents of which are hereby fully incorporated herein by reference for all purposes.

FIELD OF THE INVENTION

The field of the current invention generally regards systems and methods for deploying online media, including broadcasting live video streaming, VOD, and other content in a single stream in real time through use of an online control room.

BACKGROUND OF THE INVENTION

Live video streaming is commonplace on the Internet, as is video on demand (VOD). Both types of streaming entertainment are extremely popular, and millions of users interact with them every day.

However, there is no platform or tool that facilitates the combining of live video streaming and video on demand into a single live broadcast stream that an individual may control and disseminate online in real time to a multitude of followers without the need for particular hardware.

In addition, there are no platforms that reward participants for watching online media and/or participating in real time with an online broadcaster.

Accordingly, there is a need for an interactive media system and method of combining live video streaming and VOD video into a single live broadcast stream. There also a need for control mechanism (e.g., an online control room) that the user may use to select what streams to make available to his/her followers during the broadcast. There is also a need for a platform that rewards participants for interacting with the interactive media system.

BRIEF DESCRIPTION OF THE DRAWINGS

Various objects, features and attendant advantages of the present invention will become fully appreciated as the same becomes better understood when considered in conjunction with the accompanying drawings, in which like reference characters designate the same or similar parts throughout the several views, and wherein:

FIGS. 13-14 show CPM and RPM models according to exemplary embodiments hereof;

DETAILED DESCRIPTION OF THE PREFERRED EMBODIMENTS

Figure 1:
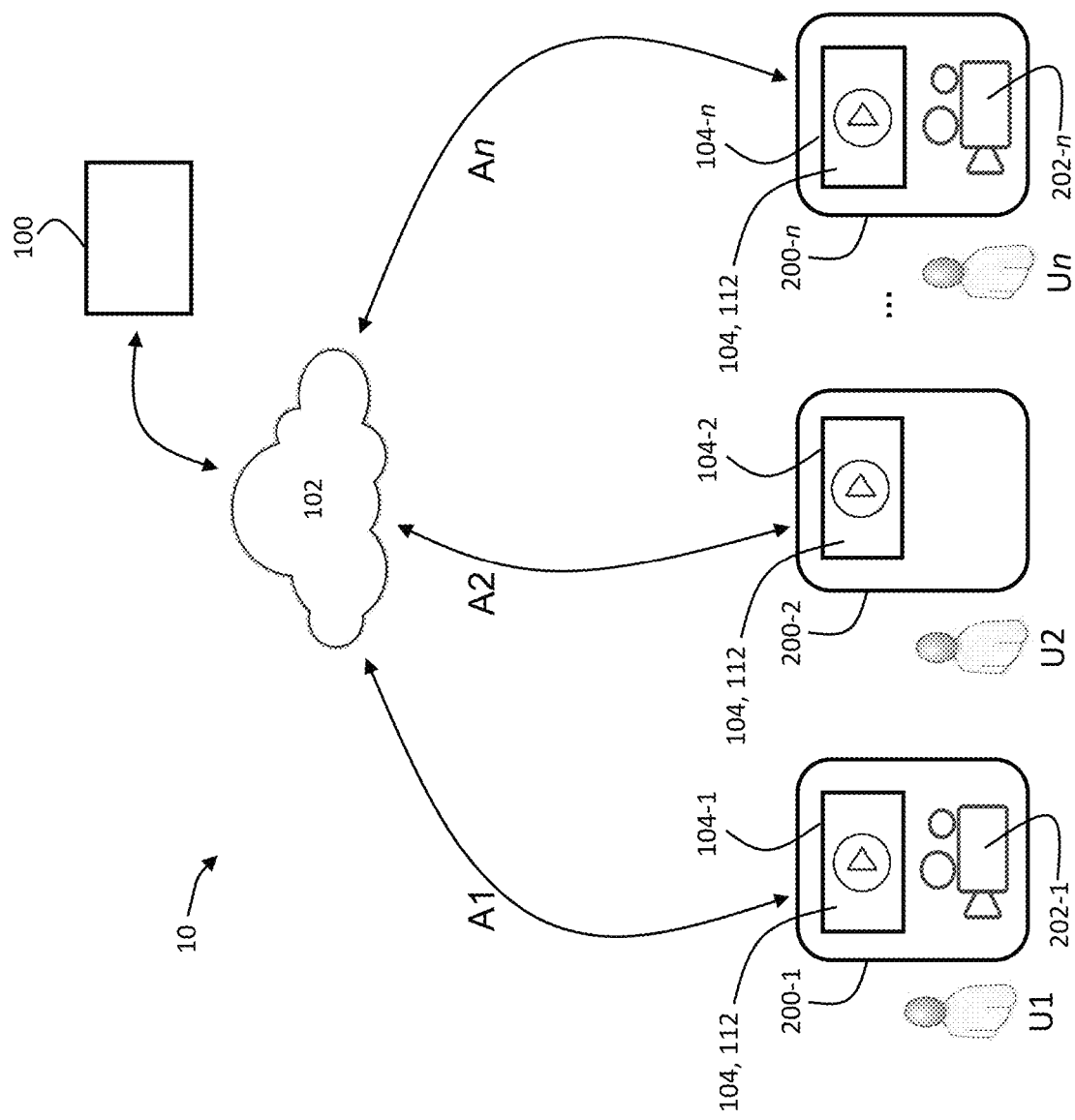
FIGS. 1-3 show aspects of an online broadcasting system according to exemplary embodiments hereof.

In general, and according to exemplary embodiments hereof, the current invention includes a system and method for broadcasting live video streaming combined with video on demand (VOD) within a single broadcast stream and shared between an owner of a web based online broadcasting channel and his/her participants (followers), all in real time. In general, the owner of a channel may broadcast a "live show" to his/her followers that may consist of live video streaming, VOD video and other content. The system and method also includes a gaming component wherein members may receive points for interacting with content that may be redeemed for cash, prices, services, donations, etc.

The system and method of the current invention will now be described in further detail with reference to FIGS. 1-24. The following detailed description is not intended to limit the current invention. Alternate embodiments and variations of the subject matter described herein will be apparent to those with ordinary skill in the art. Where the same or similar components appear in more than one figure, they are identified by the same or similar reference numerals.

As depicted in FIG. 1, the system 10 may include a cloud platform 100 that may provide a web-based experience through a network 102 (e.g., the Internet) between an owner Uo of a channel and his/her users U1, U2, . . . Un (also known in the art as followers). The owner Uo and the users Un may utilize devices 200-*n* such as a smart phones, tablet computers, desktop computers, laptop computers, other types of controllers that may communicate with the cloud platform (e.g., through use of a web browser and/or a mobile application) and any combination thereof.

The cloud platform 100 may comprise one or more servers that may include Internet servers, LAN servers, WAN servers, or other types or combinations of types of generally networked servers. Accordingly, the cloud platform 100 may include central processing units (CPUs), microprocessors, microcontrollers, memory, databases, storage, operating systems, software and other components and systems that may be required to run, manage, deploy and otherwise operate and control the programs and applications that may run within the system 10.

The cloud platform 100 may provide one or more web sites 104 that may include video players 116, messaging applications 110 and other applications that the channel owners Uo and the users Un may interact with via their devices 200 in real time. The system 10 also may integrate any or all of the applications 116, 110 into one or more mobile applications 112 that may be downloaded and run on the owner's and/or users' devices 200.

Some of the user's devices 200 may include cameras 202 that may capture live video of the respective users Un that may then be provided to the cloud platform 100. For example, as shown in FIG. 1, user's U1 device 200-1 may include a camera 202-1 but user's U2 device 200-2 may not. The live video streams of each participant may be provided to the system 10 and to the owner Uo and depending on the discretion of the owner Uo of the control room CRn, one or more of the video streams may also be shown to the users Un.

The owners Uo and the users Un may also have VOD files that they may share or otherwise make available through the system 10 to the other members Un. This will be described in detail in other sections.

Through use of the system 10, the owners Uo of individual broadcast channels may control the content that his/her followers Un may view. The content may come from a variety of sources, including but not limited to, live streaming video of the owner Uo, live streaming of a particular user Un, video files provided by the owner Uo, video files provided by a particular user Un, video files provided by a sponsor or other third-party entity, other types of video and any combination thereof. In some embodiments hereof, content from each source may be included into a single broadcast stream between the owner Uo and the users Un, and the owner Uo may switch between any of the sources in real time to be provided to their users Un. As will be described in other sections, the owner Uo may utilize a virtual control room CRn to facilitate this process.

Figure 2:
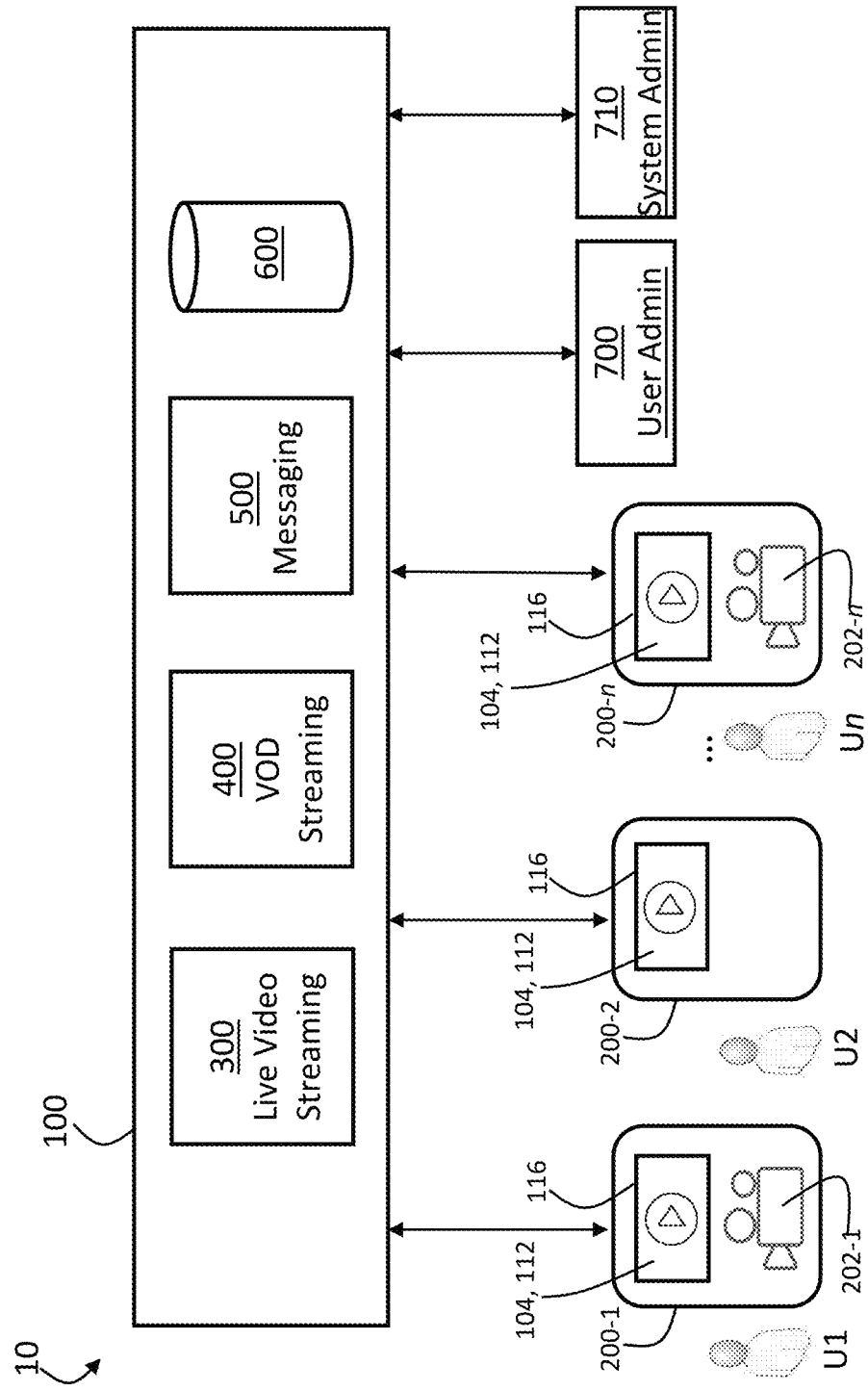

In one exemplary embodiment hereof as shown in FIG. 2, the cloud platform 100 may include a live video streaming system 300, a VOD streaming system 400, a messaging system 500, a database system 600 (including database management software such as Sequel Server or other types of databases, database systems or database management software) and other systems and elements as required for the system 10 to perform its functionalities.

The database system 600 may store and generally manage content (e.g., live video, VOD, messaging, etc.), system data, client data, registered user data (i.e., participant data), engagement and tracking data, and other types of data. The platform 100 may also include any other types of software, software packages, software platforms or other types of software and systems that may enable system 10 to host, manage, analyze and maintain mobile applications, websites, social widgets, desktop applications, network applications, and other types of applications that may perform the functions of the system 10.

The live video streaming platform 300 may include one or more systems that may provide live video streaming functionalities. The system 300 may capture live video from each participant's camera 202 and the video streams may become content sources to be add to the broadcast stream. Then, at the discretion of the owner Uo, different video streams may be made available to the users Un. In one example, the default live video stream source may be the owner's Uo video stream, and this may be shared in real time with the users Un. In other examples, the owner Uo may choose to share a different users' Un video stream, and upon choosing this alternate source within the broadcast stream, the user's Un live video stream may be shared with the other users Un. In this way the participants Un may interact with the owner Uo and potentially with one another.

The VOD streaming platform 400 may include one or more systems that may provide VOD streaming functionalities. The VOD streaming system 400 may thereby be another source of content added to the broadcast stream. The VOD streaming system 400 may stream any type of content and/or media, including without limitation, video, audio, animation, graphics, games, augmented reality objects and environments, virtual reality objects and environments, other types of media and any combination thereof. The streaming content may be pre-recorded, live and/or near live. The user Uo may choose at any time to switch to the VOD source 400 to share VOD content to his/her users Un through the broadcast.

The messaging platform 500 may include one or more systems that may provide chat, e-mail, instant messaging (IM), social network feeds, voice, other types of messaging applications and/or technologies, and any combination thereof. In one embodiment, the messaging may be provided between the users Un simultaneously and in real time. In this way the owner Uo and the users Un may interact with one another via the messaging system 500 in real time while viewing the broadcast.

The system 10 may include an administrative interface 700 that the users Un may use to generally manage their accounts within the system 10. The admin 700 may include GUIs, websites, mobile applications, desktop applications, dialogs or other type of interfaces. For example, the admin 700 may include an interface that may reside on a particular website URL that may be integrated with cloud platform 100. The interface 700 may present a log-in page that may be used by each user Un to log into the system 10 (e.g., using log-in credentials). Each user Un may be provided a username and password (or other types of credentials) that they may enter to gain access to their particular administration information. Once logged in, the admin 700 may include tools required to manage their accounts with the system 10.

The system 10 may also include an admin interface 710 to allow the administrators, providers and/or operators of the system 10 to generally manage the system 10.

Figure 3:
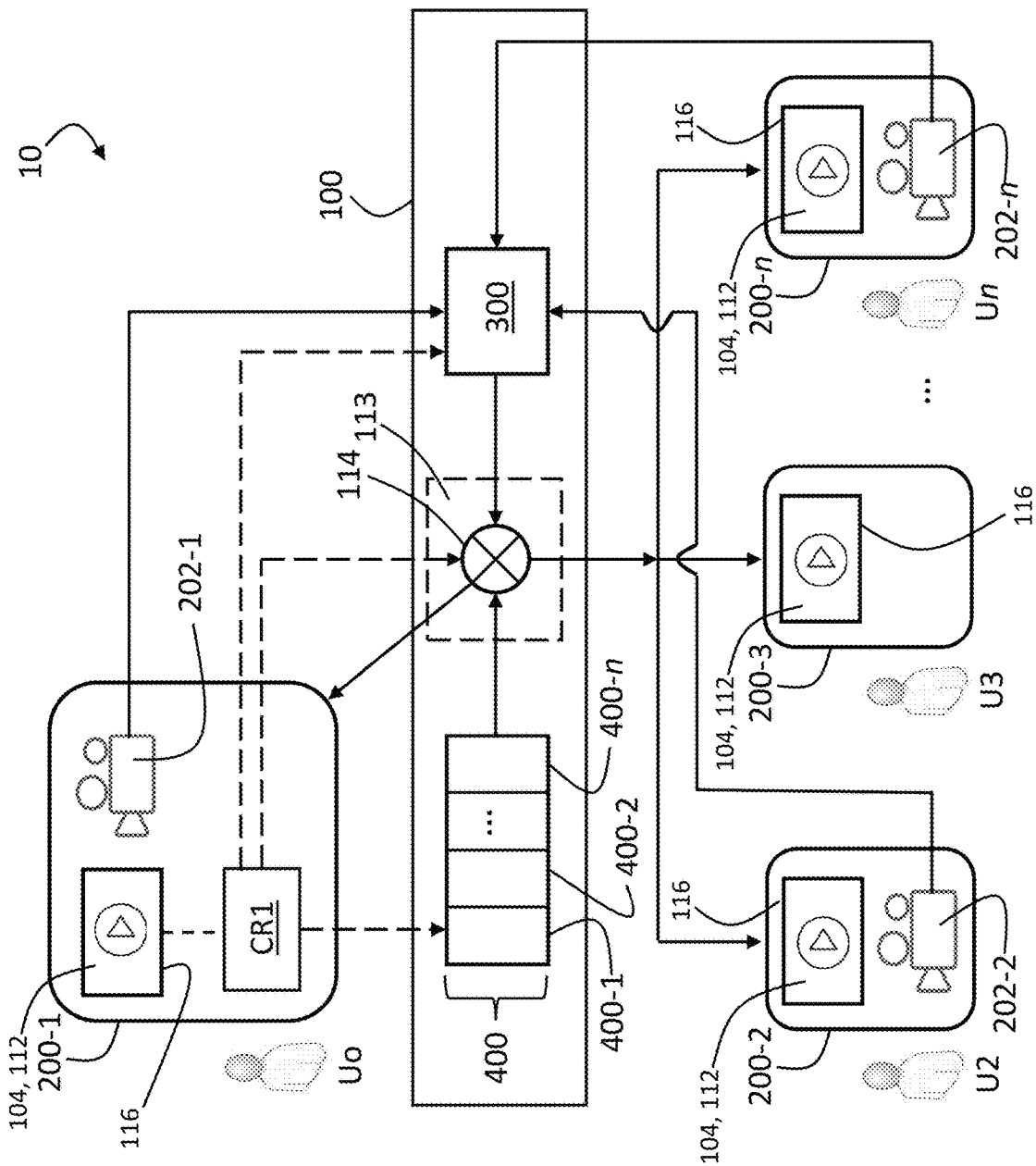

In one exemplary embodiment hereof as shown in FIG. 3, the system 10 may provide a virtual control room CRn for each registered owner Uo (e.g., the virtual control room CR1 owned and operated by user Uo). The virtual control rooms CRn may be integrated into the one or more websites 104 the system 10 may provide. The owner Uo of the control room CRn may log into the control room CRn and launch a live broadcast to his/her users Un. The control rooms CRn may also be integrated into one or more mobile applications 112 that may be downloaded and run on the users' devices 200. Each owner Uo may have their own control room CRn that other users may subscribe to and follow (e.g., interact with). The control room CRn may allow the owner Uo of the control room CRn to perform the following (without limitation) in real time:

1. Interact with their followers via interactive video broadcast;

2. Share live video streaming within the broadcast stream to the users Un;

3. Share video on demand (VOD) content within the broadcast stream from their library of videos and/or playlists to the users Un;

3. Share other users' Un live video streams within the broadcast stream with the other users Un;

4. Share other users' Un VOD content within the broadcast stream with the other users Un;

4. Share branded content (e.g., commercials) with the users Un;

5. Earn points (e.g., Pi points) by sharing the branded content;

6. Enable the users Un to earn points (e.g., Pi points) for watching the shared branded content; and 7. Control the content in a video stream (beyond opening a video stream) and to be able to change this content from different sources online;

8. Other functionalities.

As shown in FIG. 3, the system 10 may include a broadcast server 113 that may include a stream combining and selecting mechanism 114 (comprising software) that may combine various streaming data from different sources into a single broadcast. The control room CRn may then enable the owner Uo to select which streaming data from which particular source to share with his/her followers Un. For example, the broadcast server 113 and/or the stream combining and selecting mechanism 114 may combine video streaming data from each participant Un (e.g., from the video streaming system 300), VOD streaming data from the owner Uo and/or from the participants Un (e.g., from the VOD system 200) and any other types of data into one broadcast stream. The control room CRn may include the tools to enable the owner Uo to select which data from which source within the broadcast stream to stream to the followers Un.

Each control room CRn may be configured to enable control of the broadcast server 113, the stream combining and selecting mechanism 114, the video streaming system 300, the VOD system 400, and/or the messaging system 500 and any other systems of the system 10 as required. In this way, the CRn may be used to select what streaming data to present to one or more followers Un.

In one example, the owner Uo of the control room CRn may choose to stream his/her live video stream from his/her camera 202, and upon choosing this, the broadcast server 113 and/or the stream combining and selecting mechanism 114 may add the owner's camera 202 as a source to the broadcast and stream the live video to the participants Un. The participants Un may then view the live video stream on their devices 200.

The owner Uo may then choose to share a VOD file 400-1 with his/her followers, at which time the broadcast server 113 and/or the stream combining and selecting mechanism 114 may set the VOD as a source and stream the chosen VOD file data 400-1 so that the followers Un may all view the VOD stream 400-1 on their devices 200. The owner Uo of each control room CRn may then switch back and forth at any moment as he/she may desire between interacting with his/her followers via their live video stream and/or via the VOD streaming in real time.

The owner Uo of the control room CRn (e.g., user Uo with CR1) may also enable VOD data from a different user Un (e.g., user U2) to be shared with the followers Un. In this case, a different VOD file 400 (e.g., VOD file 400-2 belonging to user U2) may be chosen and the broadcast server 113 and/or the stream combining and selecting mechanism 114 may set the new VOD as a source and stream the VOD 400-2 to the followers Un. For example, during a live show, a particular user Un may ask if they may share their VOD video with the other followers and the user Un may upload the video to the system 10. The owner Uo of the control room CRn may then select the user's VOD and the broadcast server 113 and/or the stream combining and selecting mechanism 114 may set the VOD file as the source within the broadcast and provide the VOD stream to the followers Un.

The owner Uo of a control room CRn also may choose to stream the live streaming video of a particular user Un to the followers Un, and upon selecting this, the broadcast server 113 and/or the stream combining and selecting mechanism 114 may set the user's live stream as a source and stream it to the followers Un.

Aspects of the system 10, of the control room CRn, and of the users' interfaces will be described next with reference to an example workflow summary and FIGS. 4-11. In this example, the owner Uo may be user #3 and an example participant Un may be User #29 (U29) as depicted in the figures.

Figure 4:
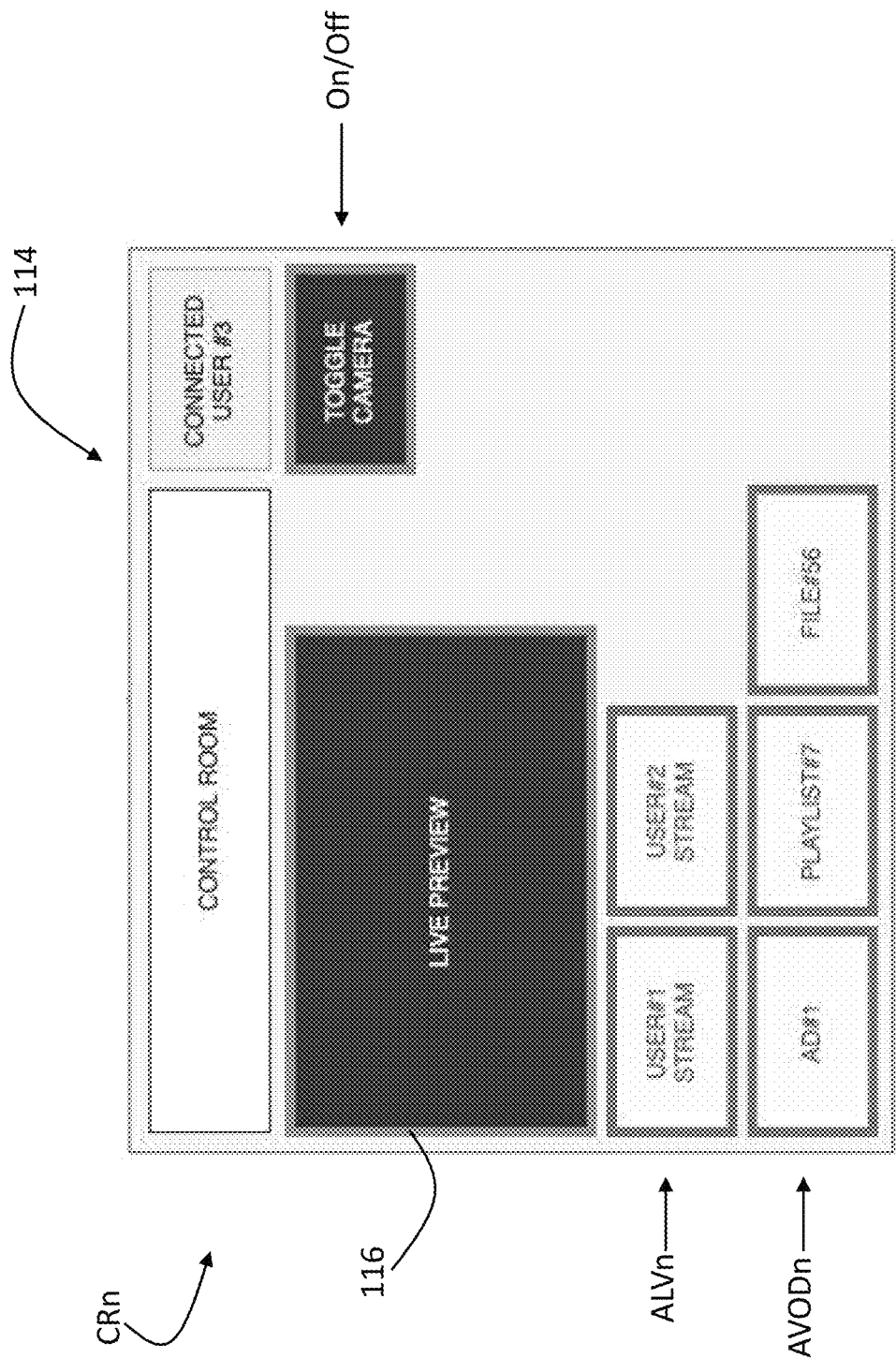
FIGS. 4-6 show aspects of an online broadcasting control room according to exemplary embodiments hereof.

In one exemplary embodiment as shown in FIG. 4, the control room CRn may include a GUI 114 that may include a video player 116 that may play a video stream provided by the cloud platform 100 (e.g., live video streaming video, VOD video, etc.). The GUI 114 also may display the available live video streams ALVn of each participant Un (e.g., the video streams of User #1 and User #2 taken from their respective cameras 202 as shown). The GUI 114 also may display the available VOD (AVOD) playlists, video files, sponsored content (e.g., AD #1, Playlist #7, File #56 as shown) that may be available for the owner Uo to share with the participants Un. Note that the AVOD icons (e.g., the playlist icon) may expand upon selection to show a multitude of available videos that may be included within the playlists. The CRn may also provide a camera On/Off mechanism On/Off that the owner Uo may use to turn on and off his/her camera 202. In the example shown in FIG. 4, the camera 202 may be turned off and as such, live video streaming of the owner Uo from the camera 202 may not be available to the owner Uo or to the participants Un.

Figure 5:
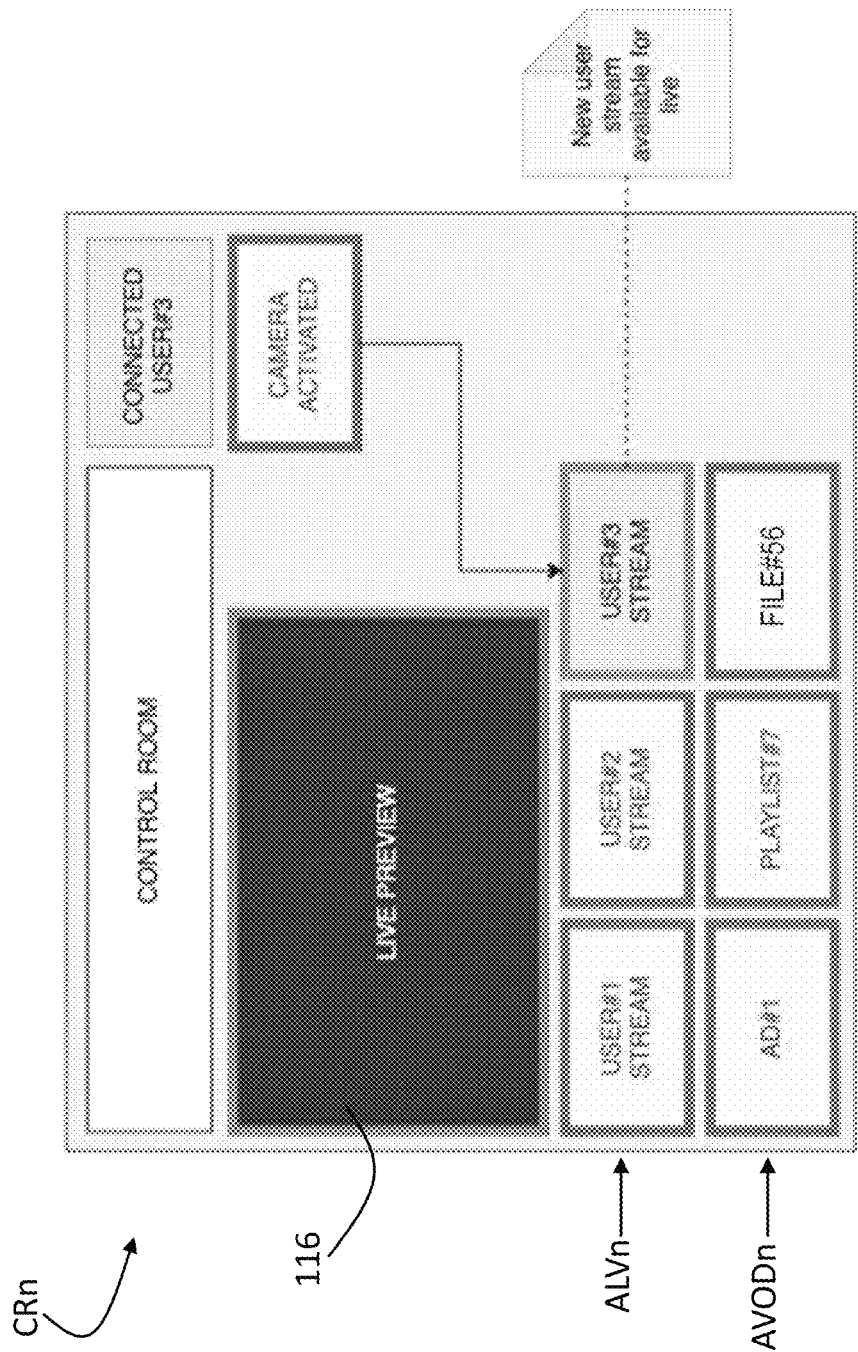
Figure 6:
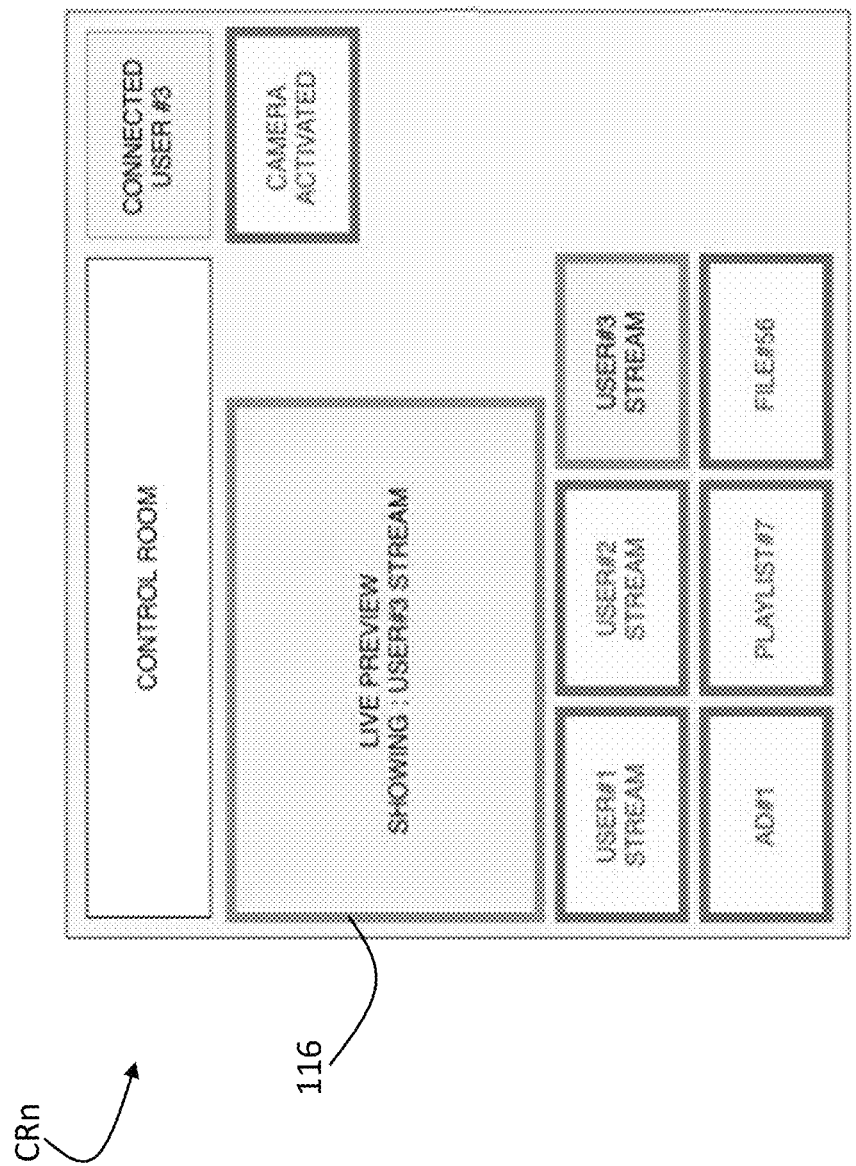
Figure 7:
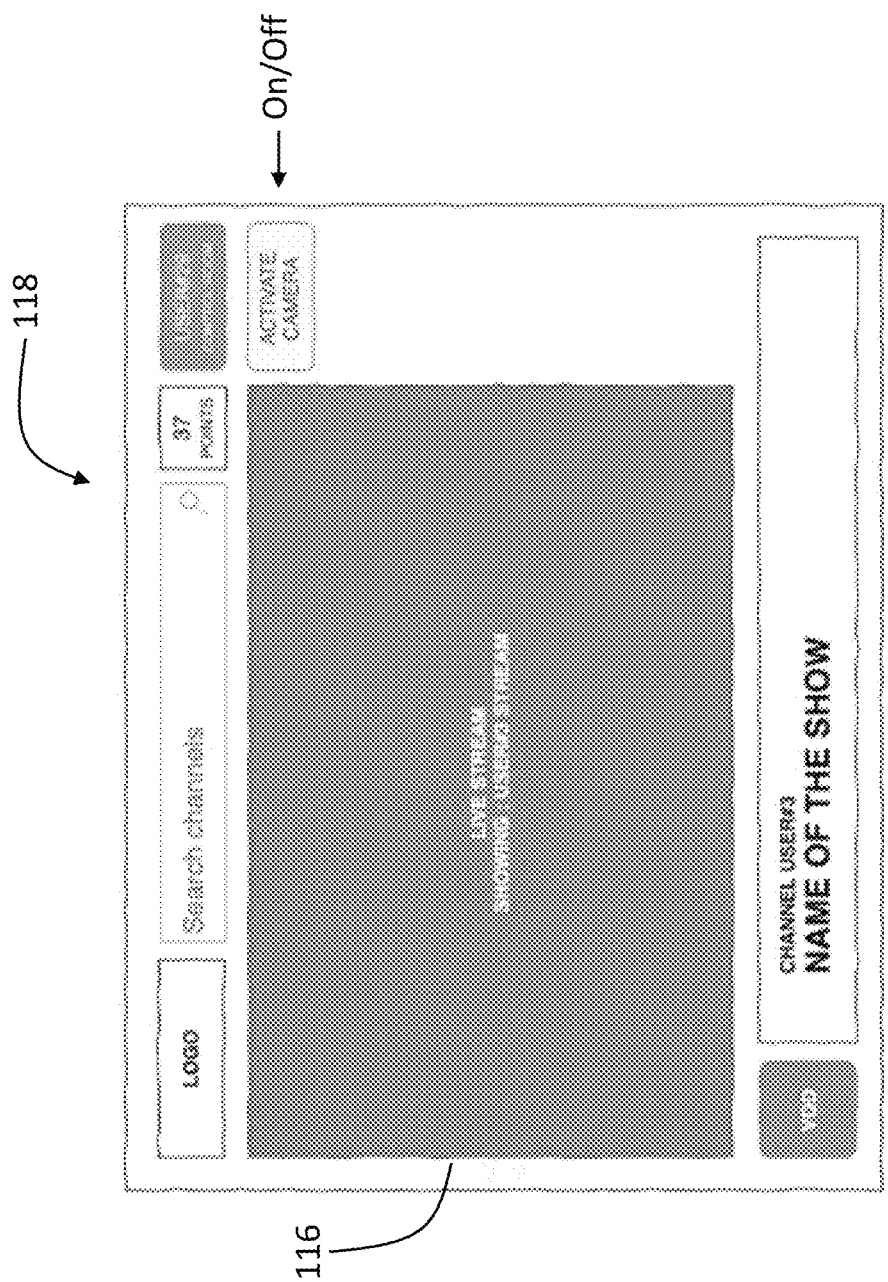
FIG. 7 shows aspects of a follower's graphical user interface according to exemplary embodiments hereof.

When the owner Uo may turn on his/her camera 202, the live video stream of the owner Uo from the camera 202 may appear in the available streams ALVn pane as shown in FIG. 5 (User #3 Stream as shown). Upon the owner Uo clicking on his/her live video stream in this pane, the broadcast server 113 and/or stream combining and selecting mechanism 114 may set the live video stream data from the owner's camera 202 (User #3 Stream) as a source within the broadcast stream and provide it to the owner Uo (as shown in FIG. 6) and to the participants Un (e.g., to User #29 as shown in FIG. 7). Note that FIG. 7 represents the GUI 118 that the system 10 may provide to the participants Un. The GUI 118 may include a video player 116, a camera on/off mechanism that the participant may use to turn on/off his/her camera 202, as well as other functionalities and information.

Figure 8:
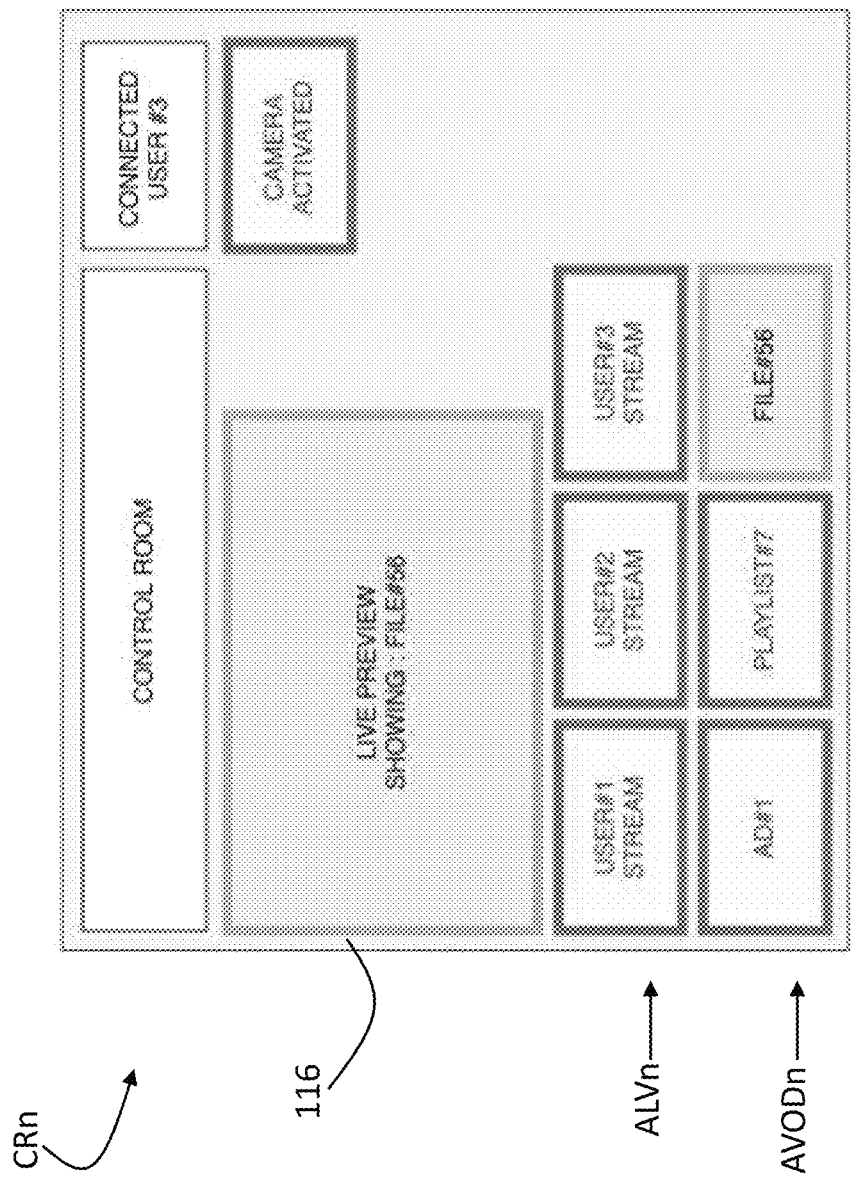
FIG. 8 shows aspects of an online broadcasting control room according to exemplary embodiments hereof.
Figure 9:
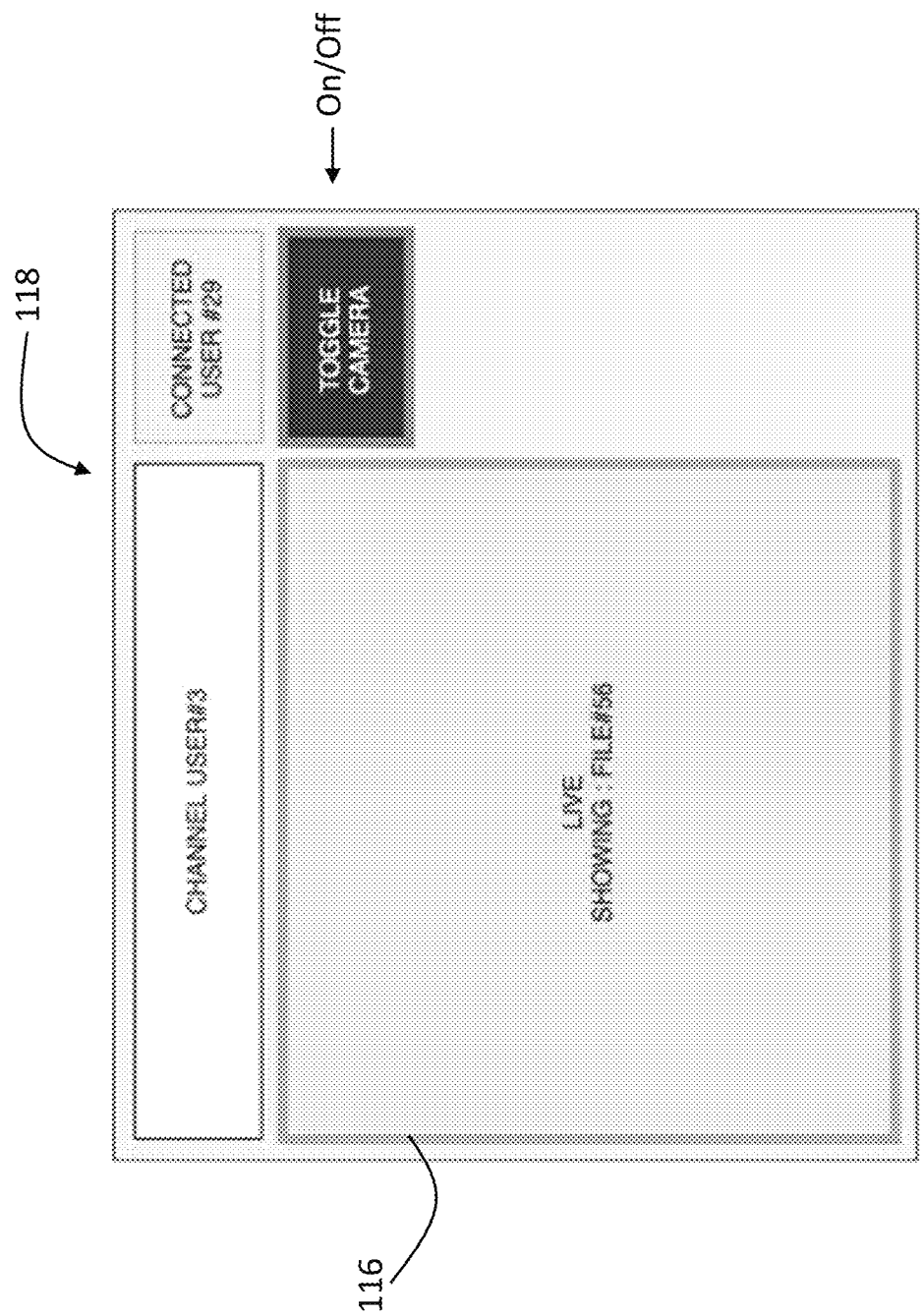
FIG. 9 shows aspects of a follower's graphical user interface according to exemplary embodiments hereof.

Next, if the owner Uo may wish to share a video file with the participants Un, the owner Uo may choose a video from his/her available videos AVODn (e.g., File #56 as shown in FIG. 8), and upon choosing the video, the broadcast server 113 and/or stream combining and selecting mechanism 114 may set the video as a source within the broadcast stream and provide it to the owner Uo to the participants Un. As shown in FIG. 8, the File #56 video may simultaneously play on the owner's Uo video player 116, and as shown in FIG. 9, the File #56 may play on the participants' Un video player 116 (e.g., User #29's video player 116). In addition, as shown in FIG. 8, the owner Uo may also simultaneously view the available live streams ALVn from each of the users Un so that he/she may watch the users' reactions as they view the streaming video.

Figure 10:
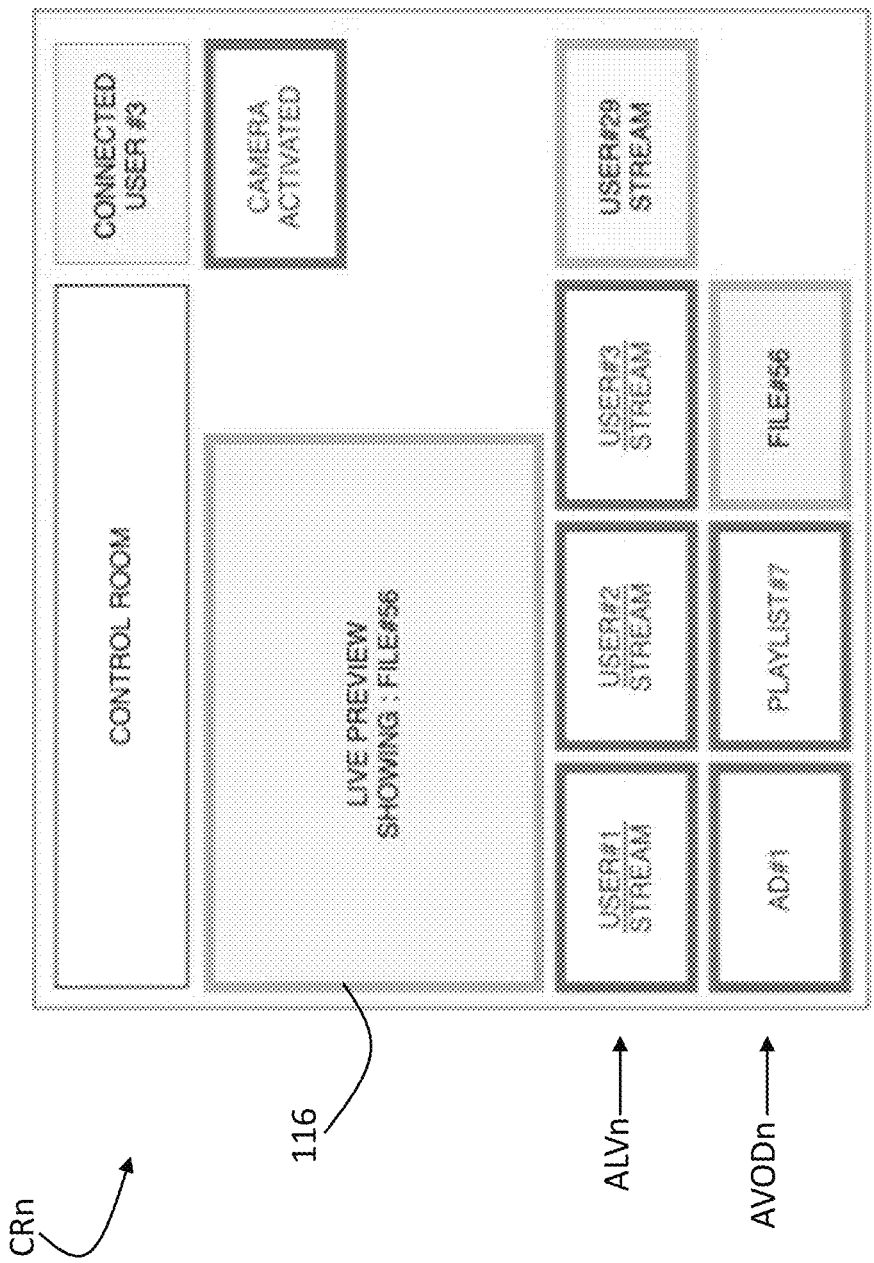
FIG. 10 shows aspects of an online broadcasting control room according to exemplary embodiments hereof.
Figure 11:
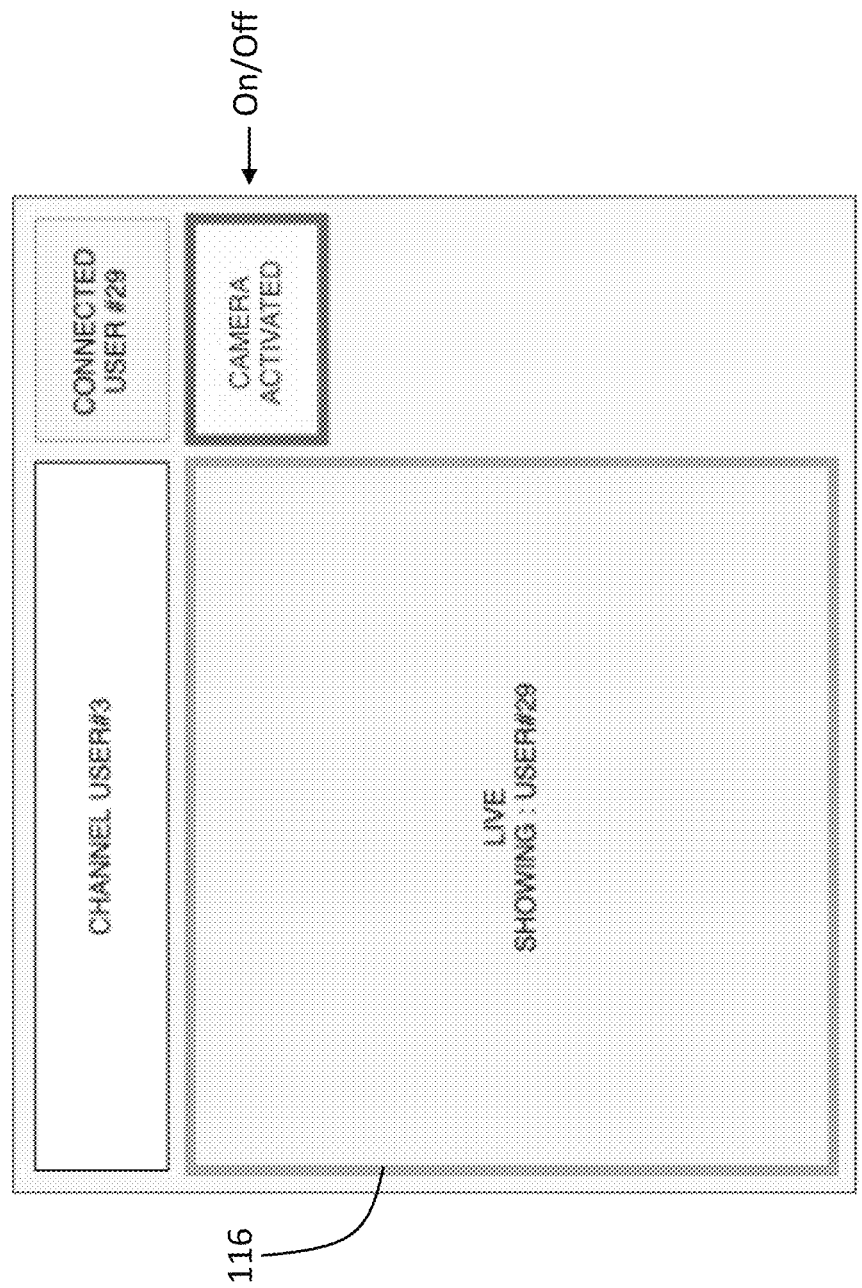
FIG. 11 shows aspects of a follower's graphical user interface according to exemplary embodiments hereof.

Next, if a participant Un may activate his/her camera 202 (e.g., User #29) the live video stream for this user Un taken by this user's camera 202 may appear in the control room ALVn pane as shown in FIG. 10. Then, if the owner Uo may choose this live video stream, the live video stream may be provided to the broadcast server 113 that may add it as a source, and then streamed to the owner Uo and to the participants Un (as shown in FIG. 11 for User #29).

In another exemplary embodiment hereof, a participant Un may provide video files to the system 10 that may be available for an owner Uo of a control room CRn to select and share with his/her followers Un. Once uploaded, these video VOD selections may appear in the owner's AVODn pane. For example, expanding on the example described above, File #56 may have been provided to the system 10 by a follower Un (not the owner Uo), made available to the owner Uo, chosen by the owner Uo, set as a source by the system 10 and streamed by the broadcast server 113 to the followers Un within the broadcast stream.

Figure 12:
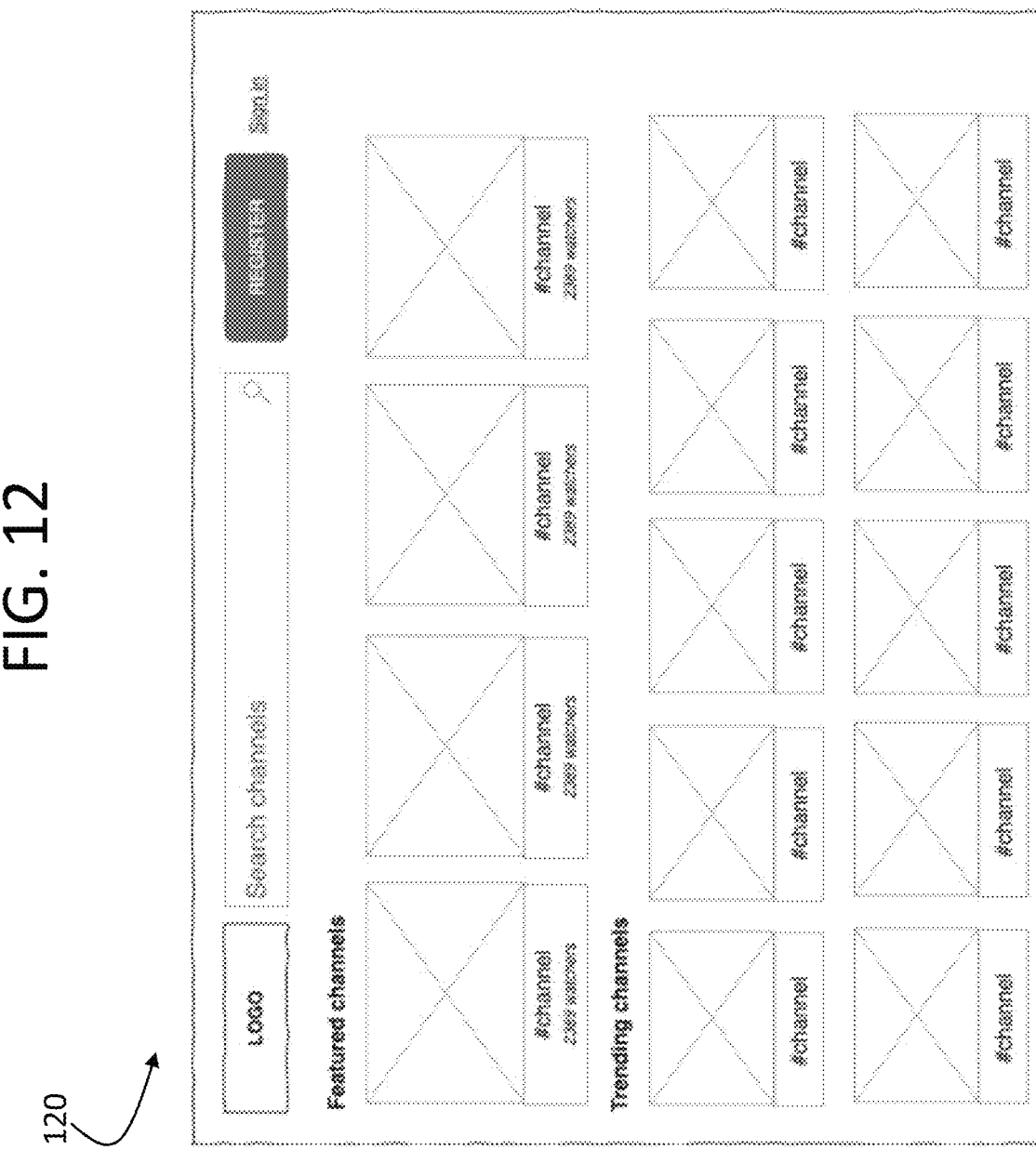
FIG. 12 shows aspects of a system homepage according to exemplary embodiments hereof.

As described earlier, the system 10 may provide one or more websites 104 that may provide access to the different broadcast channels (shows) that may be provided by one or more owners Uo of various control rooms CRn. In one exemplary embodiment hereof as shown in FIG. 12, the website 104 may include a homepage 120 that may display a variety of information such as "Featured Channels", "Trending Channels" and other information. The homepage 120 may also provide a search field that a user Un may use to search for a particular channel, a particular owner Uo, a particular video, etc. To participate with a particular channel, the user Un may simply choose the channel and begin the experience.

In one exemplary embodiment hereof, the owner Uo and/or a user Un may instruct the system 10 to record all or a portion of a live show (a live broadcast stream) and make it available as a VOD selection at a later date.

It is understood by a person of ordinary skill in the art, upon reading this specification, that the control room CRn and/or the user's GUI 118 may include other layouts, content, and/or functionalities. For example, the user's GUI 118 may include two or more video players that may each show different video streams. In one example of this type, the user's GUI 118 may include one video player 116 to view the live streaming video of the owner Uo and a second video player 116 that may show a VOD selection made by the owner Uo. In another example, the user's GUI 118 may include additional video players 116 that may display the live video streams of some or all of the other users Un. In another example, the GUIs 118 may include a messaging box that may include group chats, text messaging, email and/or other types of messaging between the owner Uo and the users Un, between users Un and other users Un and any combination thereof. This added content may be at the discretion of the owner Uo or otherwise. It is understood that the control rooms CRn and/or the user's GUIs 118 may include any combination of the functionalities as described in this specification or otherwise, and that the scope of the system 10 is not limited in any way by the content that the CRn and/or the user's GUIs 118 may provide.

In addition, other videos, such as branded videos provided to the system 10, to the owners Uo and to the users Un by companies and brands, may be available to the owners of each control room CRn to share with their followers. In one example the videos may be commercials (or ads) for a particular brand and/or its products/services. In another example, the videos may be content sponsored by a particular brand. In any event, the owner of the room CRn may receive points for sharing the videos (e.g., Pi points), and the followers may receive points for watching the videos (e.g., Pi points). The owner Uo may also share sponsored videos provided by a particular user Un similar to as described above with relation to sharing a VOD from a particular user Un. The points may be continually collected and saved, by the owners Uo of the rooms and the followers Un, and used to purchase videos, goods, services or any other assets as available. In return for the exposure that this may provide the sponsors of the sponsored video, the sponsors may subsidize the goods, services and other assets that may be provided to the owners Uo and the users Un upon redemption of the points. The sponsors may also simply provide cash payment to the providers of the system 10 that may be allocated to the owners Uo, the users Un and to the providers of the system 10.

In one example, the system 10 may offer "Pi points" to owners Uo and to users Un for sharing and viewing sponsored videos. For example, an owner Uo may share a sponsored video for users Un to view and receive one Pi point for every one second of the video that is viewed by the users (in aggregate). In addition, the users Un may also each receive one Pi point for every second that they may each view. In this way, the system 10 may provide a revenue sharing model for the owners Uo and the users Un.

In one exemplary embodiment hereof, the owner Uo of a live broadcast may choose to periodically interject short, sponsored videos (similar to commercials) during his/her broadcast for his/her followers Un to view. By doing so, the owner Uo and the users Un may all earn Pi points. When this happens, the users Un will each earn a Pi point for every second of video he/she may view, and the owner Uo may earn a Pi point for each second of video all of the users Un may view in aggregate.

In another exemplary embodiment hereof, the providers of the system 10 may also earn Pi points when the owners Uo share sponsored videos and when the users Un view sponsored videos. In one example, the providers of the system 10 may also earn one Pi point for every second of sponsored videos viewed by the users Un in aggregate. In this way, the revenue sharing may provide a business model for the providers of the system 10. And again, the sponsors of the sponsored videos will pay for the exposure that their brand may receive for the viewing of the sponsored videos.

FIG. 13 shows a first example cost per thousand impressions (CPM), revenue per thousand (RPM) and resulting Pi points model.

FIG. 14 shows a second example cost per thousand impressions (CPM), revenue per thousand (RPM) and resulting Pi points model.

FIGS. 15-19 show screenshots of example website pages provided by the system 10.

Figure 15:
FIG. 15 shows aspects of a system homepage according to exemplary embodiments hereof.

FIG. 15 shows an example homepage (landing page) of the system 10 that shows "Featured Channels" and "Followed Channels" (channels that the particular user Un may be actively following).

Figure 16:
FIGS. 16 and 16A show aspects of an online broadcasting control room according to exemplary embodiments hereof.
Figure 16A:
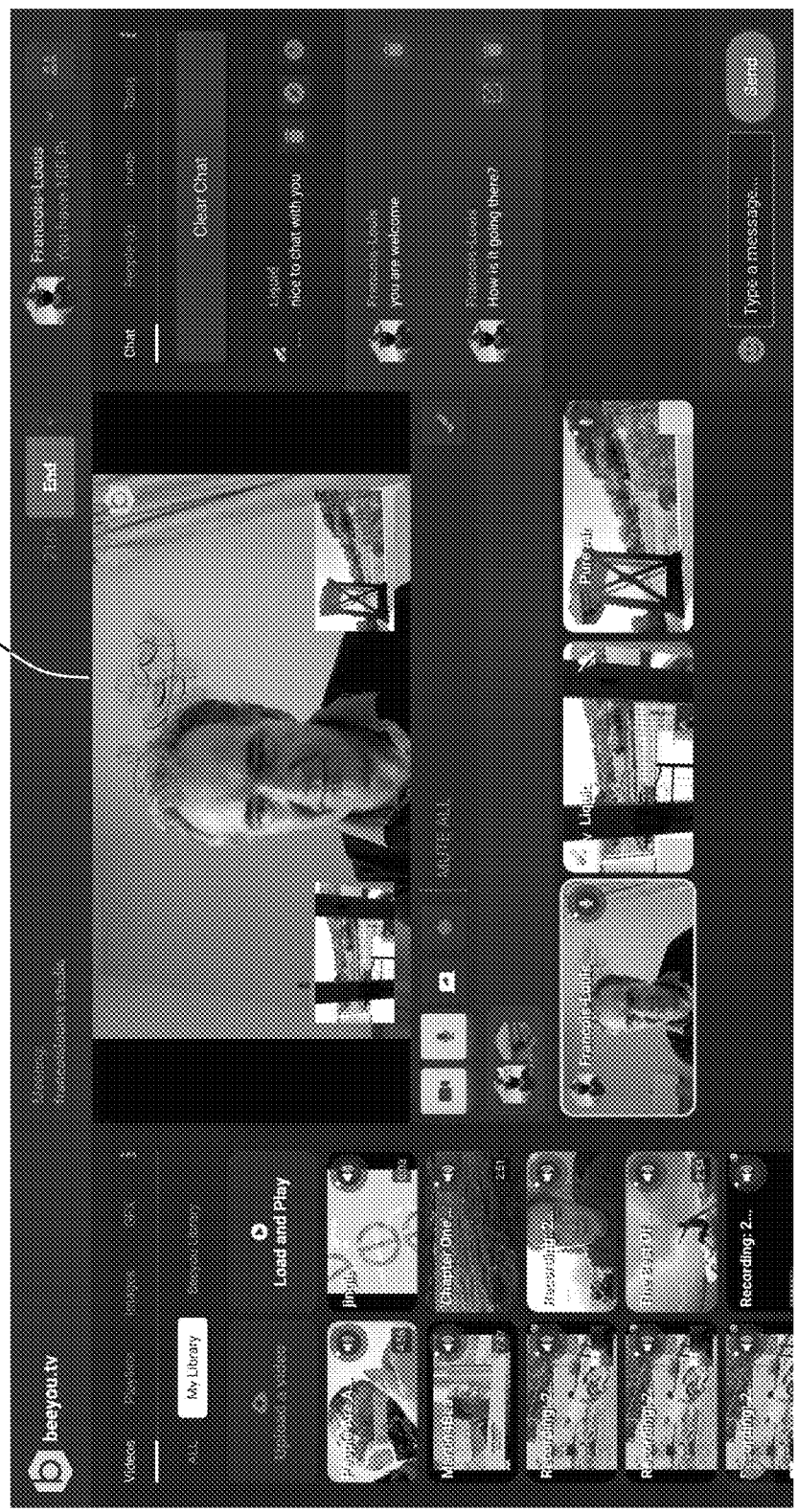

FIGS. 16 and 16A show example control rooms CRn of an owner Uo.

Figure 17:
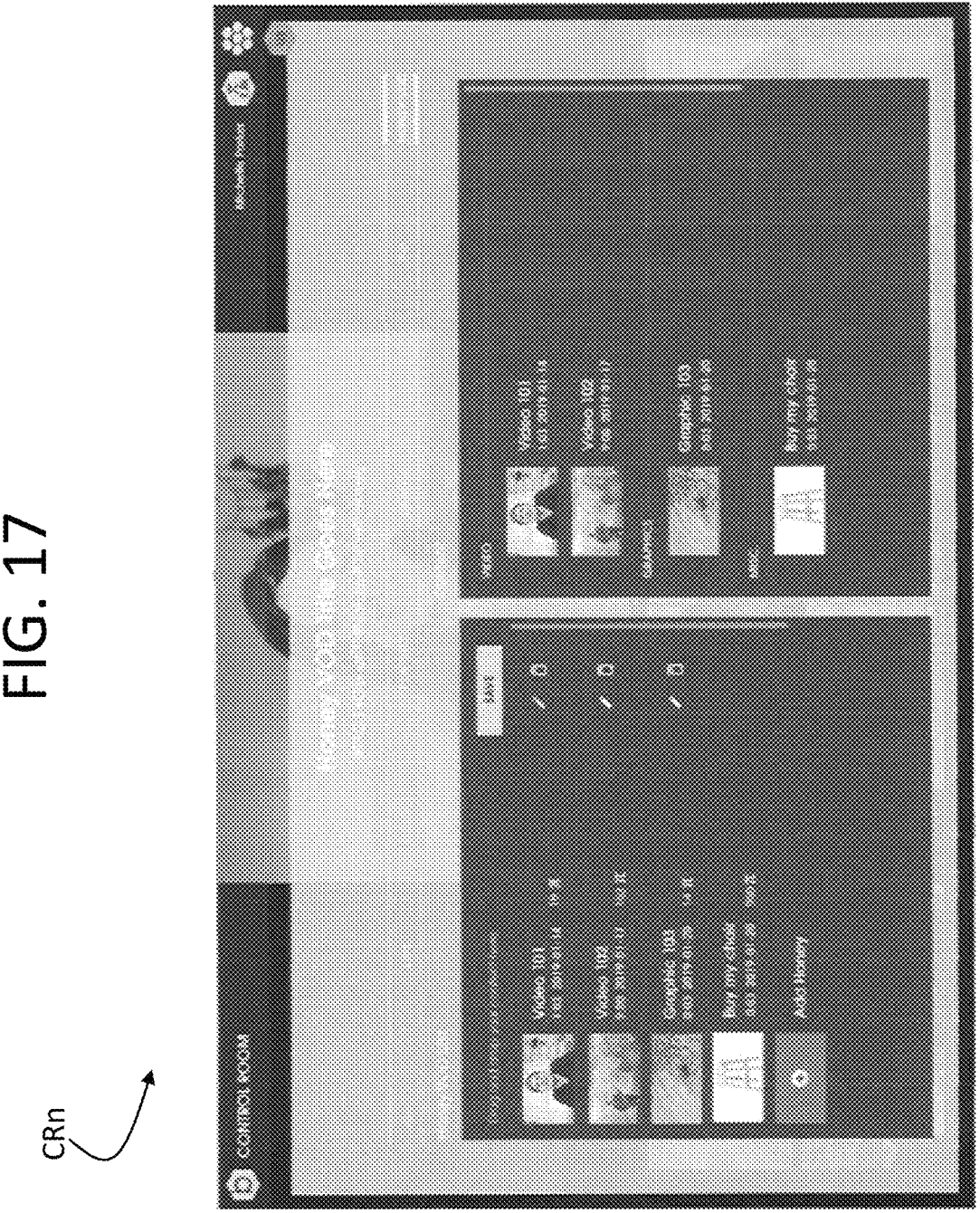
FIG. 17 shows aspects of a video on demand playlist according to exemplary embodiments hereof.

FIG. 17 shows an example expanded available VOD listing.

Figure 18:
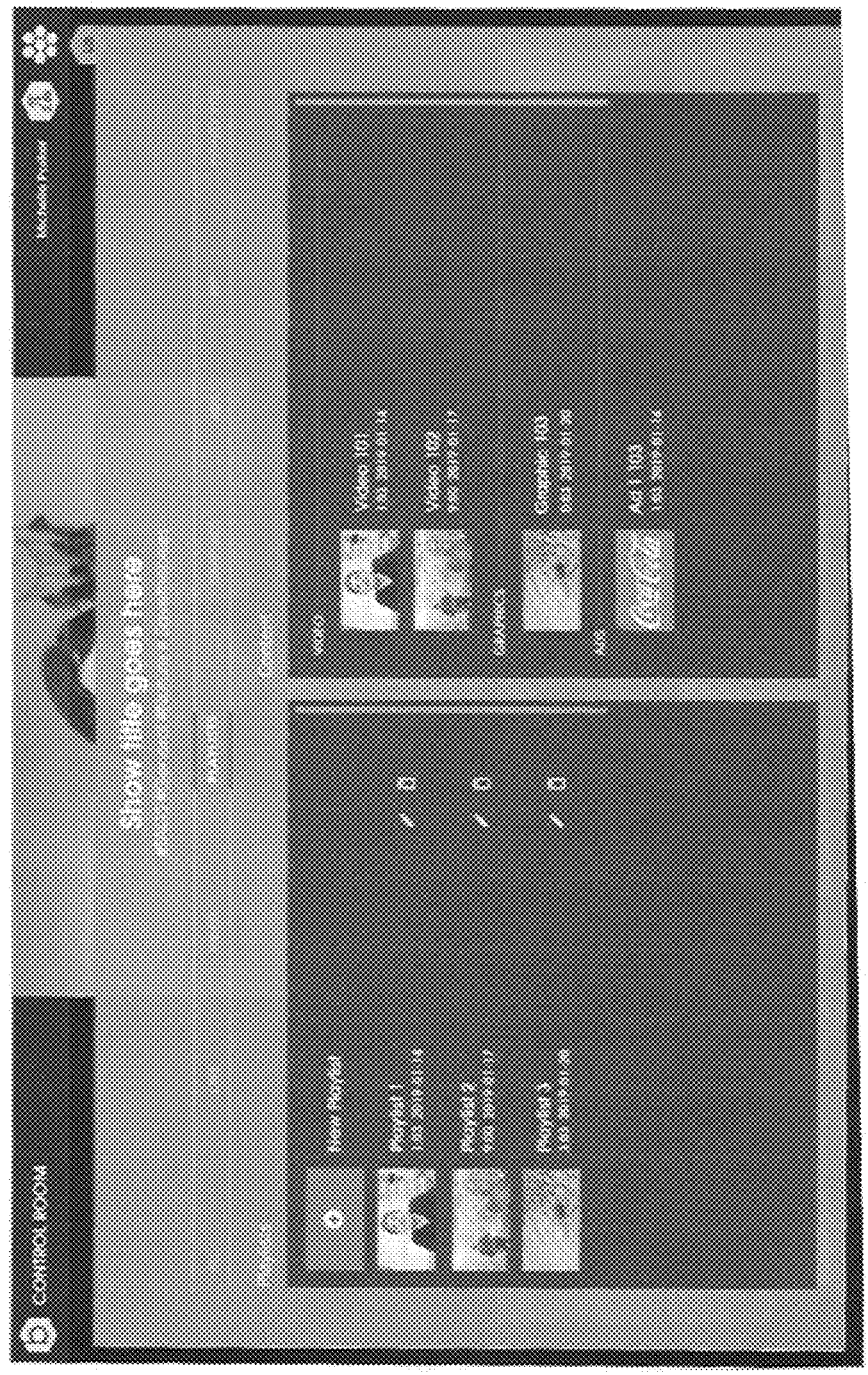
FIGS. 18, 18A and 18B shows aspects of an online show playlist according to exemplary embodiments hereof.
Figure 18A:
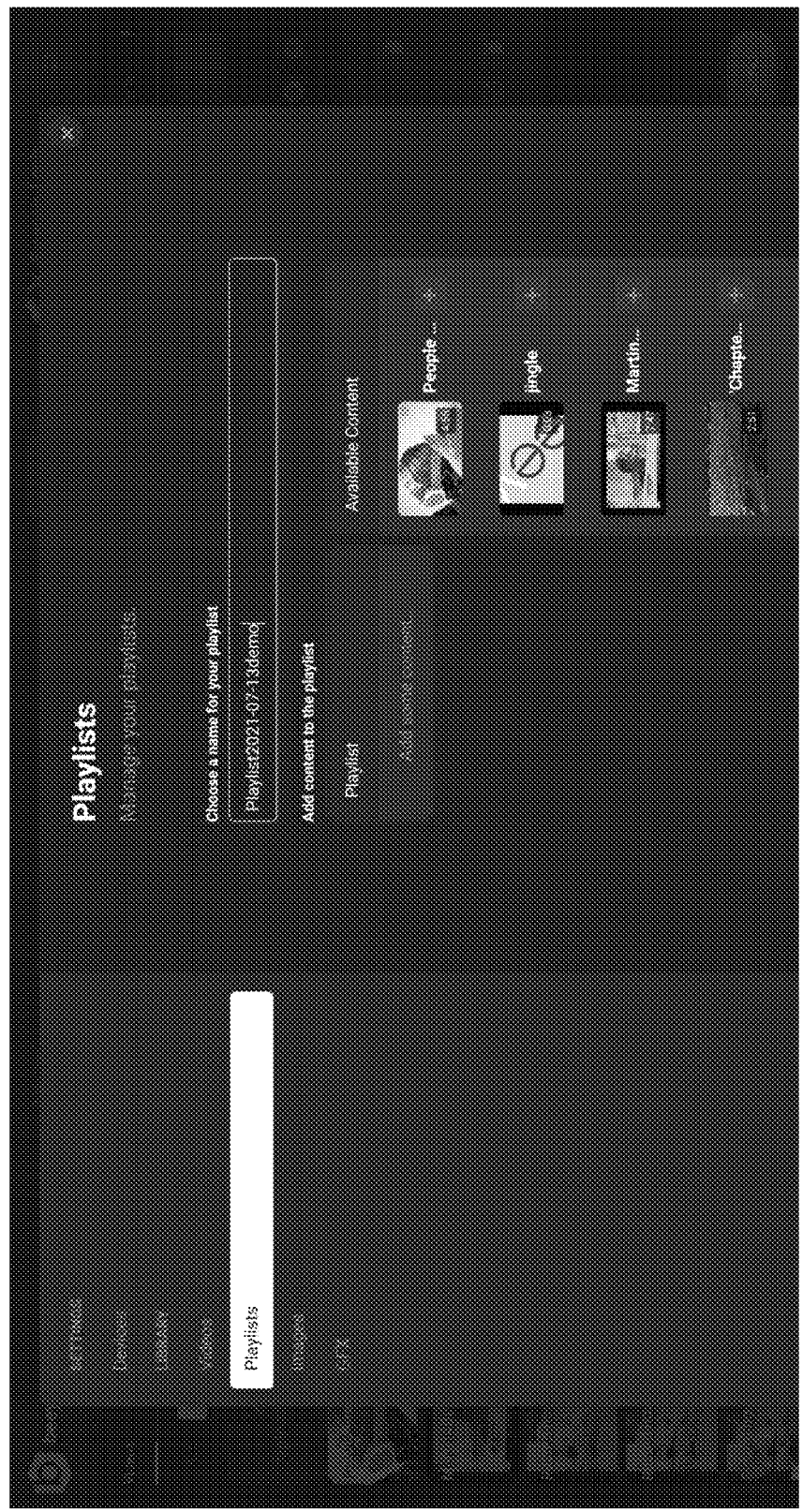
Figure 18B:
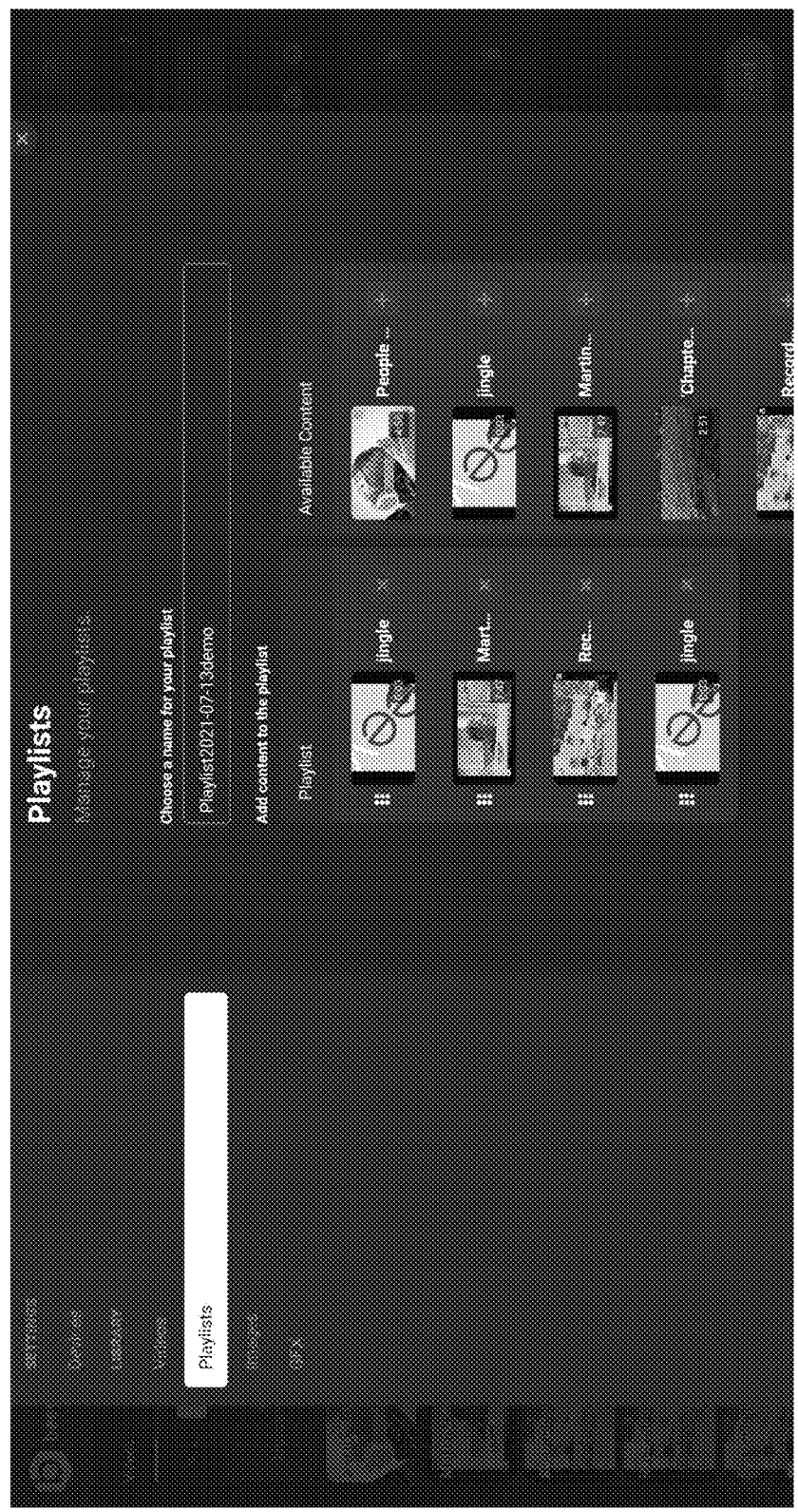

FIGS. 18, 18A and 18B show example expanded playlists.

Figure 19:
FIG. 19 shows aspects of a follower's graphical user interface according to exemplary embodiments hereof.

FIG. 19 shows an example user's GUI 118.

Additional Viewing Panes 132

Figure 20:
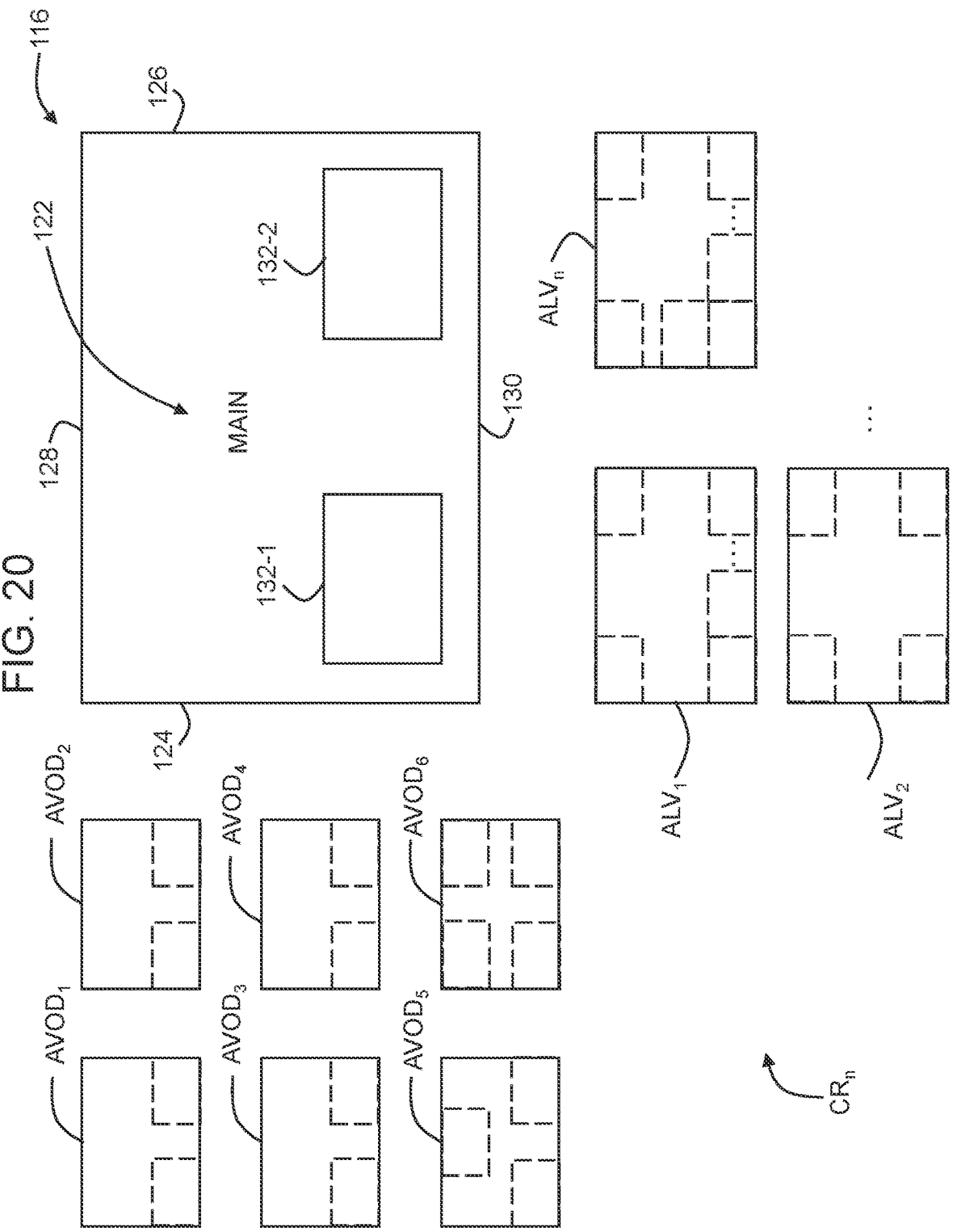
FIG. 20 shows aspects of an online broadcasting control room according to exemplary embodiments hereof.

In some embodiments as shown in FIG. 20, the system 10 includes additional viewing panes within and/or overlaid the main viewing area within the video player 116 within a control room CRn.

In addition, in some embodiments, it may be preferable that users Un of the system 10, in addition to owners Uo of control rooms CRn, be provided with access to the control rooms CRn (e.g., control rooms CRn owned by owners Uo that the users Un may be registered to follow) so that the users Un also may view and/or otherwise interact with the various elements of the control rooms CRn (e.g., the video players 116 and the additional elements within the control rooms CRn as described herein). In some embodiments, it may be preferable that the users Un be provided with a version of the control rooms CRn with limited administrative controls so that the core functionalities of the control rooms CRn may be controlled by the respective owners Uo of the control rooms CRn and not the general users Un. For example, it may be preferable that the users Un be provided with versions of the control rooms CRn that allow the users to view the video players 116, the ALVn media, the AVODn media, and the additional viewing panes (described below), but that may not provide control of administrative tools retained by the owner Uo.

In some embodiments, the video player 116 includes a main viewing pane 122 including a left side 124, a right side 126, a top side 128, and a bottom side 130 defining the main viewing pane's perimeter.

In some embodiments, the video player 116 also includes one or more additional viewing panes 132-1, 132-2, . . . 132-n (individually and collectively 132) located within the main viewing pane 122 (e.g., overlaid on top of the main viewing pane 122). The system 10 is adapted to provide these additional viewing panes 132 with media content in parallel to and simultaneously with the media content the system 10 provides to the main viewing pane 122. In this way, a user Un may view both the content in the main viewing pane 122 and the content in the additional viewing panes 132 simultaneously (with the content showing in the additional viewing panes 132 most likely different than the content showing in the main viewing pane 122). These additional viewing panes 132 also may be referred to as Picture in Picture (PIP) viewing panes. The media content provided to the main viewing pane 122 and/or to the additional viewing panes 132 by the system 10 may include, without limitation, video, live streams, animation, photographs, graphics, other types of images (all with or without audio), and any combinations thereof.

In some embodiments, the additional viewing panes 132 are preferably smaller in size compared to the main viewing pane 122 so that the additional viewing pane 132 may all fit within the main viewing pane 122 as shown. Accordingly, and depending on the size of each additional viewing pane 132, multiple additional viewing panes 132 may be included and supplied with media content by the system 10.

In some embodiments, any media available from the system 10 may be provided to the additional viewing panes 132. For example, any media available from the live video streaming system 300, the VOD streaming system 400, and/or any other system within the system 10 may be provided to the additional panes 132.

In some embodiments, the additional viewing pane(s) 132 may be positioned and arranged in any location within the perimeter of the main viewing pane 122. For example, as shown in FIG. 20, a first additional viewing pane 132-1 may be located in the lower left corner of the main viewing pane 122, and a second additional viewing pane 132-2 may be located in the lower right corner of the main viewing pane 122. It is understood that this example is for demonstration purposes and that the additional viewing pane(s) 132 may be positioned and arranged in any suitable area within the perimeter of the main viewing pane 122. For example, an additional viewing pane 132 may be located in the upper left corner, and/or in the upper right corner of the main viewing pane 122. In another example, an additional viewing pane 132 may be located in an upper area (e.g., adjacent the main pane's top side 128 between the left side 124 and the right side 126), in a lower area (e.g., adjacent the main pane's bottom side 130 between the left side 124 and the right side 126), in a left side area (e.g., adjacent the main pane's left side 124 between the top side 128 and the bottom side 130), in a right side area (e.g., adjacent the main pane's right side 126 between the top side 128 and the bottom side 130), in a central area (e.g., between the left side 124 and the right side 126 and between the top side 128 and the bottom side 130) and/or in any other locations within the perimeter of the main viewing pane 122. As will be described in other sections, the location of each additional viewing pane 132 may be chosen by an owner Uo and/or by a user Un of the system 10.

In some embodiments, the shape of each additional viewing pane 132 is preferably rectangular and/or square, but it is understood that the additional viewing panes 132 may include any suitable shapes. Also, the shape of one additional viewing pane 132 need not necessarily match the shape of another additional viewing pane 132, however, it may be preferable that they do.

In some embodiments, the size (e.g., the width and height) of each viewing pane 132 may preferably be chosen to fit within the main viewing pane 122 without obstructing the media content being delivered to the main viewing pane 122. In some embodiments, the size of each additional viewing pane 132 may be chosen (by an owner Uo and/or by a user Un) by right-mouse clicking on the additional viewing pane 132 and choosing a predefined size or by entering a custom size. This also may be performed via a toolbar of other type of administrative tool provided by the system 10. Accordingly, the size of one additional viewing pane 132 need not necessarily match the size of another additional viewing pane 132, however, it may be preferable that they do.

In some embodiments, an owner Uo and/or a user Un may determine the media content that the system 10 provides to each additional viewing pane(s) 132, and when. In addition, an owner Uo and/or a user Un may determine the location of each additional viewing pane(s) 132 within the perimeter of the main viewing pane 122 as each additional viewing pane(s) 132 delivers the media.

Figure 21:
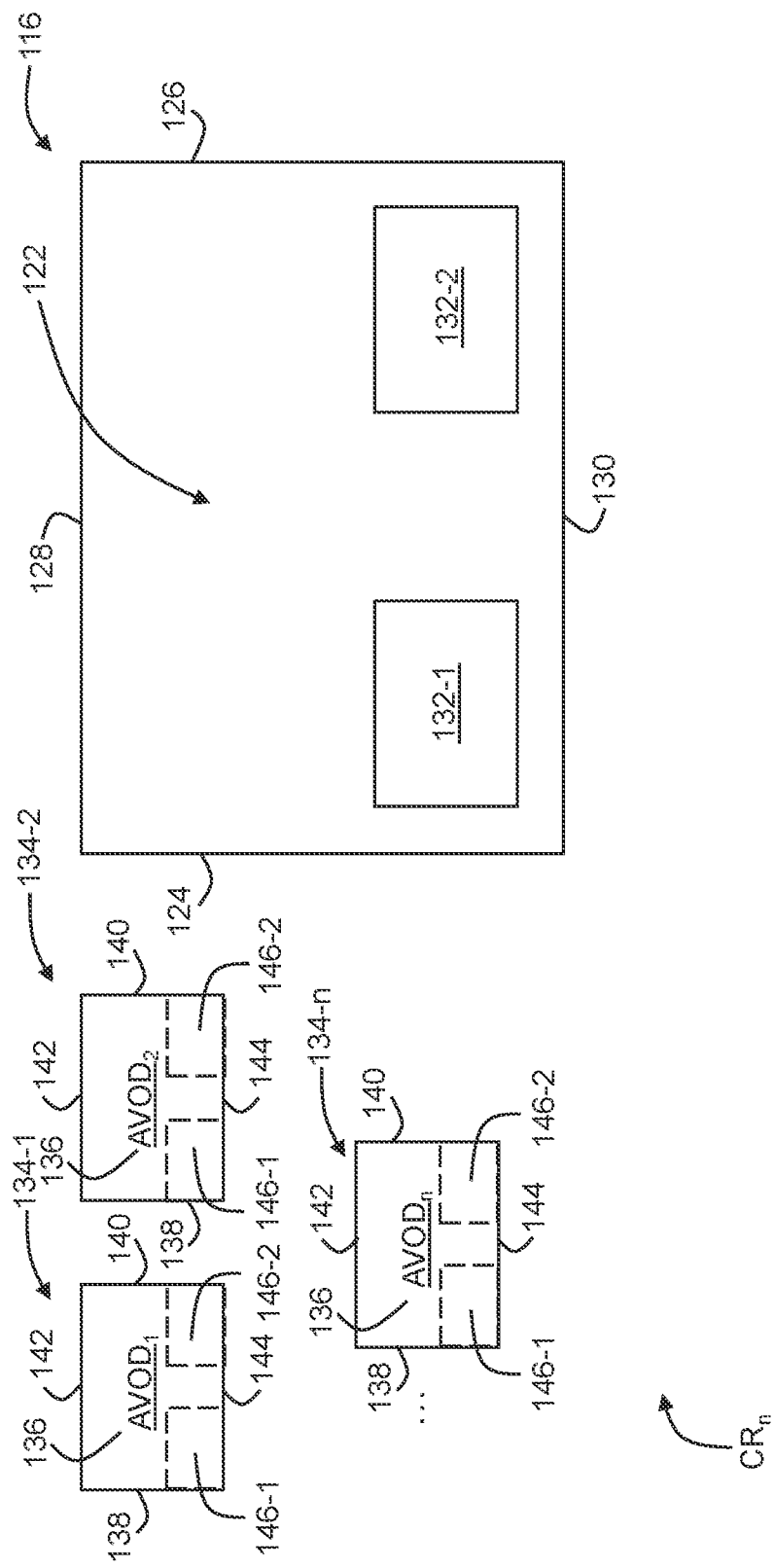
FIG. 21 shows aspects of an online broadcasting control room according to exemplary embodiments hereof.

In some embodiments as shown in FIG. 21, an available video on demand (AVODn) player 134 within a control room CRn may include a viewing pane 136 with a left side 138, a right side 140, a top side 142, and a bottom side 144 defining the AVODn player perimeter. In addition, within the AVODn player perimeter, the AVODn player 134 may include one or more clickable areas 146-1, 146-2, . . . 146-n (collectively and individually 146) (also referred to as hotspots) that when clicked cause the AVODn media associated with the particular AVODn player 134 to play within a corresponding additional viewing pane 132 within the perimeter of the main viewing pane 122. In this way, each clickable area 146 is an individual user interface element.

In a first example as shown in FIG. 21, a first clickable area 146-1 in a first AVOD1 player 134-1 (e.g., located in the lower left corner of the first AVOD1 player's 134-1's viewing pane 136) may be mapped to a first additional viewing pane 132-1 in the main viewing pane 122, and a second clickable area 146-2 (e.g., located in the lower right corner of the first AVOD1 player's 134-1's viewing pane 136) may be mapped to a second additional viewing pane 132-2 in the main viewing pane 122. Accordingly, when the first clickable area 146-1 is clicked, the AVOD1 associated with the AVOD1 player 134-1 is set as a source to the first additional viewing pane 132-1 by the system 10 (e.g., by the broadcast server 113 and/or the stream combining and selecting mechanism 114), such that the AVOD1 media content may play within the first additional viewing pane 132-1. In addition, when the second clickable area 146-2 is clicked, the AVOD1 associated with the AVOD1 player 134-1 is set as a source to the second additional viewing pane 132-2 by the system 10 (e.g., by the broadcast server 113 and/or the stream combining and selecting mechanism 114), such that the AVOD1 media content may play within the second additional viewing pane 132-2.

Note that in this example, the first clickable area 146-1 is located in the lower left corner of the first AVOD1 player 134-1 and the first additional viewing pane 132-1 is located in the lower left corner of the main viewing pane 122 such that there exists a spatial correspondence between the location of the first clickable area 146-1 and the first additional viewing pane 132-1 (both are in the lower left corner of their respective players). Note that this also is true for the second clickable area 146-2 and the second additional viewing pane 132-2 (both are in a lower right corner of their respective players). However, it is understood that this spatial correspondence may not be necessary.

In a second example, a first clickable area 146-1 in a second AVOD2 player 134-2 (e.g., located in the lower left corner of the second AVOD2 player's 134-2's viewing pane 136) may be mapped to a first additional viewing pane 132-1 in the main viewing pane 122, and a second clickable area 146-2 (e.g., located in the lower right corner of the second AVOD1 player's 134-2's viewing pane 136) may be mapped to a second additional viewing pane 132-2 in the main viewing pane 122. Accordingly, when the first clickable area 146-1 is clicked, the AVOD2 associated with the AVOD2 player 134-2 is set as a source to the first additional viewing pane 132-1 by the system 10 (e.g., by the broadcast server 113 and/or the stream combining and selecting mechanism 114), such that the AVOD2 media content may play within the first additional viewing pane 132-1. In addition, when the second clickable area 146-2 is clicked, the AVOD2 associated with the AVOD2 player 134-2 is set as a source to the second additional viewing pane 132-2 by the system 10 (e.g., by the broadcast server 113 and/or the stream combining and selecting mechanism 114), such that the AVOD2 media content may play within the second additional viewing pane 132-2.

It is understood that the examples described above showing a first AVOD1 player 134-1 and a second AVOD2 player 134-2, each with first and second clickable areas 146-1, 146-2 mapped to corresponding additional viewing panes 132-1, 132-2, respectively, are meant for demonstration and that the system 10 may include any number of AVODn players 134 each with any number of clickable areas 146 mapped to any number of corresponding additional viewing panes 132, and that the scope of the system 10 is not limited in any way by the number of AVODn players 134 and/or the number of clickable areas 146 mapped to any number of additional viewing panes 132.

It also is understood that while the examples above described a first clickable area 146-1 located in a lower left corner of a AVODn player 134, and a second clickable area 146-2 located in a lower right corner of a AVODn player 134, the clickable areas 146 may be positioned and arranged in any suitable location within the perimeter of an AVODn player 134. For example, a clickable area 146 may be located in the upper left corner, and/or in the upper right corner of a AVODn player 134. In another example, a clickable area 146 may be located in an upper area (e.g., adjacent the AVODn player's top side 142 between the left side 138 and the right side 140), in a lower area (e.g., adjacent the AVODn player's bottom side 144 between the left side 138 and the right side 140), in a left side area (e.g., adjacent the AVODn player's left side 138 between the top side 142 and the bottom side 144), in a right side area (e.g., adjacent the AVODn player's right side 140 between the top side 142 and the bottom side 144), in a central area (e.g., between the AVODn player's left side 138 and right side 140 and between the top side 142 and bottom side 144), and/or in any other locations within the perimeter of the AVODn player 134. Also, the location of each clickable area 146 may be chosen by an owner Uo and/or by a user Un of the system 10.

In some embodiments, the number and location of clickable areas 146 in a one AVODn player 134 may match the number and location of clickable areas 146 in another AVODn player 134 as described in the examples above, however, this may not be necessary and one AVODn player 134 may include a different number of clickable areas 146 located in different locations within its pane 136 compared to another AVODn player 134.

In some embodiments, an owner Uo and/or a user Un may determine and set the number of clickable areas 146, the location(s) of the clickable areas 146, and/or the mapping of the clickable areas 146 to the additional viewing panes 132. In this way, an owner Uo and/or a user Un may choose to enable particular AVODn to be played in particular additional viewing panes 132 while choosing not to allow other AVODn to be played in other particular additional viewing panes 132.

Figure 22:
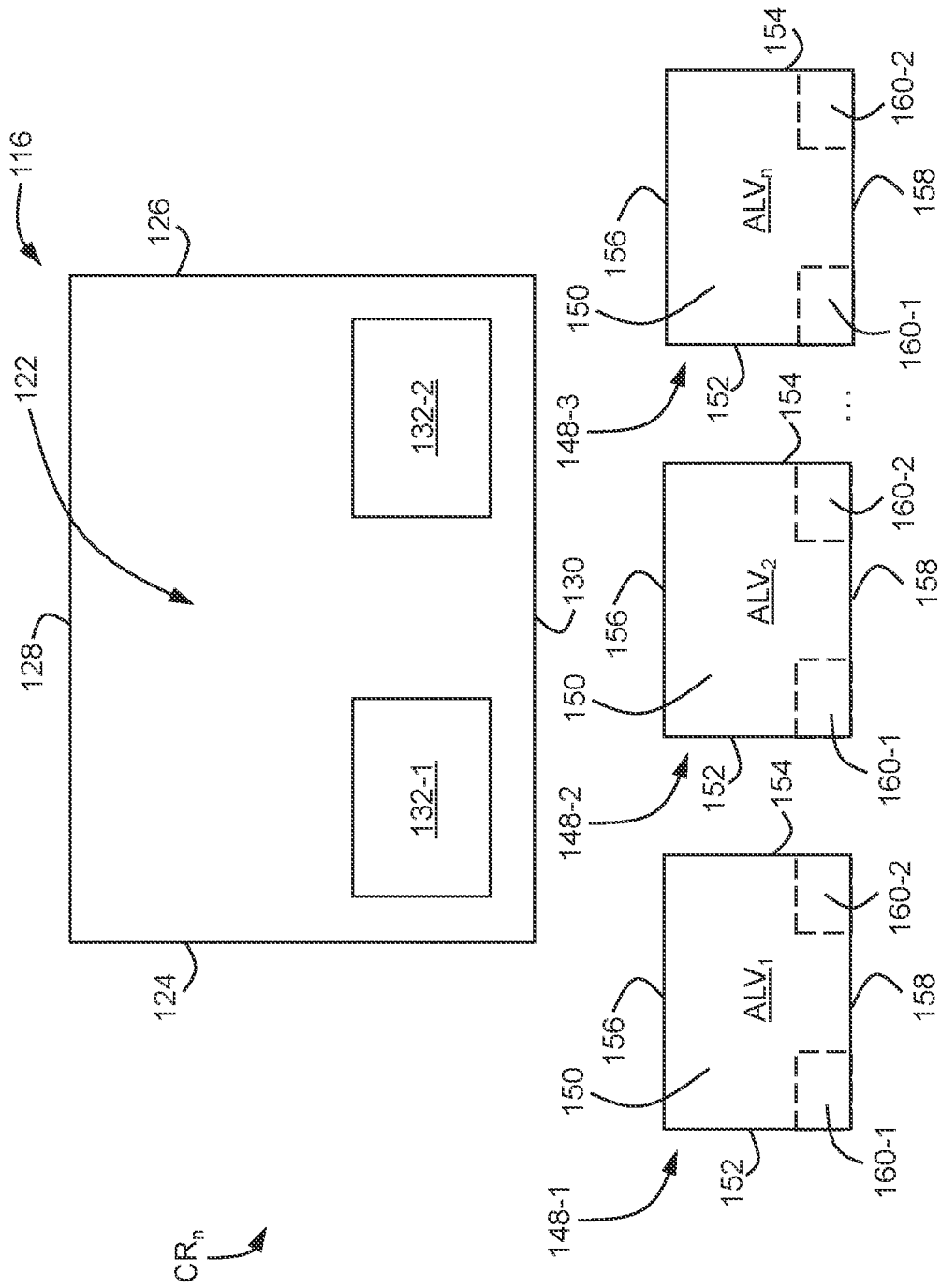
FIG. 22 shows aspects of an online broadcasting control room according to exemplary embodiments hereof.

In some embodiments as shown in FIG. 22, an available live video stream (ALVn) player 148 within a control room CRn may include a viewing pane 150 with a left side 152, a right side 154, a top side 156, and a bottom side 158 defining the ALVn player perimeter. In addition, within the ALVn player perimeter, the ALVn player 148 may include one or more clickable areas 160-1, 160-2, . . . 160-n (collectively and individually 160) (also referred to as hotspots) that when clicked cause the ALVn media associated with the particular ALVn player 148 to play within a corresponding additional viewing pane 132 within the perimeter of the main viewing pane 122. In this way, each clickable area 160 is an individual user interface element.

In a first example as shown in FIG. 22, a first clickable area 160-1 in a first ALV1 player 148-1 (e.g., located in the lower left corner of the first ALV1 player's 148-1's viewing pane 150) may be mapped to a first additional viewing pane 132-1 in the main viewing pane 122, and a second clickable area 160-2 (e.g., located in the lower right corner of the first ALV1 player's 148-1's viewing pane 150) may be mapped to a second additional viewing pane 132-2 in the main viewing pane 122. Accordingly, when the first clickable area 160-1 is clicked, the ALV1 associated with the ALV1 player 148-1 is set as a source to the first additional viewing pane 132-1 by the system 10 (e.g., by the broadcast server 113 and/or the stream combining and selecting mechanism 114), such that the ALV1 media content may play within the first additional viewing pane 132-1. In addition, when the second clickable area 160-2 is clicked, the ALV1 associated with the ALV1 player 148-1 is set as a source to the second additional viewing pane 132-2 by the system 10 (e.g., by the broadcast server 113 and/or the stream combining and selecting mechanism 114), such that the ALV1 media content may play within the second additional viewing pane 132-2.

Note that in this example, the first clickable area 160-1 is located in the lower left corner of the first ALV1 player 148-1 and the first additional viewing pane 132-1 is located in the lower left corner of the main viewing pane 122 such that there exists a spatial correspondence between the location of the first clickable area 160-1 and the first additional viewing pane 132-1 (both are in the lower left corner of their respective players). Note that this also is true for the second clickable area 160-2 and the second additional viewing pane 132-2 (both are in a lower right corner of their respective players). However, it is understood that this spatial correspondence may not be necessary.

In a second example, a first clickable area 160-1 in a second ALV2 player 148-2 (e.g., located in the lower left corner of the second ALV2 player's 148-2's viewing pane 150) may be mapped to a first additional viewing pane 132-1 in the main viewing pane 122, and a second clickable area 160-2 (e.g., located in the lower right corner of the second ALV1 player's 148-2's viewing pane 150) may be mapped to a second additional viewing pane 132-2 in the main viewing pane 122. Accordingly, when the first clickable area 160-1 is clicked, the ALV2 associated with the ALV2 player 148-2 is set as a source to the first additional viewing pane 132-1 by the system 10 (e.g., by the broadcast server 113 and/or the stream combining and selecting mechanism 114), such that the ALV2 media content may play within the first additional viewing pane 132-1. In addition, when the second clickable area 160-2 is clicked, the ALV2 associated with the ALV2 player 148-2 is set as a source to the second additional viewing pane 132-2 by the system 10 (e.g., by the broadcast server 113 and/or the stream combining and selecting mechanism 114), such that the ALV2 media content may play within the second additional viewing pane 132-2.

It is understood that the examples described above showing a first ALV1 player 148-1 and a second ALV2 player 148-2, each with first and second clickable areas 160-1, 160-2 mapped to corresponding additional viewing panes 132-1, 132-2, respectively, are meant for demonstration and that the system 10 may include any number of ALVn players 148 each with any number of clickable areas 160 mapped to any number of corresponding additional viewing panes 132, and that the scope of the system 10 is not limited in any way by the number of ALVn players 148 and/or the number of clickable areas 160 mapped to any number of additional viewing panes 132.

It also is understood that while the examples above described a first clickable area 160-1 located in a lower left corner of a ALVn player 148, and a second clickable area 160-2 located in a lower right corner of a ALVn player 148, the clickable areas 160 may be positioned and arranged in any suitable location within the perimeter of an ALVn player 148. For example, a clickable area 160 may be located in the upper left corner, and/or in the upper right corner of a ALVn player 148. In another example, a clickable area 160 may be located in an upper area (e.g., adjacent the ALVn player's top side 156 between the left side 152 and the right side 154), in a lower area (e.g., adjacent the ALVn player's bottom side 158 between the left side 152 and the right side 154), in a left side area (e.g., adjacent the ALVn player's left side 152 between the top side 156 and the bottom side 158), in a right side area (e.g., adjacent the ALVn player's right side 154 between the top side 156 and the bottom side 158), in a central area (e.g., between the ALVn player's left side 152 and right side 154 and between the top side 156 and bottom side 158), and/or in any other locations within the perimeter of the ALVn player 148. Also, the location of each clickable area 160 may be chosen by an owner Uo and/or by a user Un of the system 10.

In some embodiments, the number and location of clickable areas 160 in a one ALVn player 148 may match the number and location of clickable areas 160 in another ALVn player 148 as described in the examples above, however, this may not be necessary and one ALVn player 148 may include a different number of clickable areas 160 located in different locations within its pane 150 compared to another ALVn player 148.

In some embodiments, an owner Uo and/or a user Un may determine and set the number of clickable areas 160, the location(s) of the clickable areas 160, and/or the mapping of the clickable areas 160 to the additional viewing panes 132. In this way, an owner Uo and/or a user Un may choose to enable particular ALVn to be played in particular additional viewing panes 132 while choosing not to allow other ALVn to be played in other particular additional viewing panes 132.

Interactive Areas 162

Figure 23:
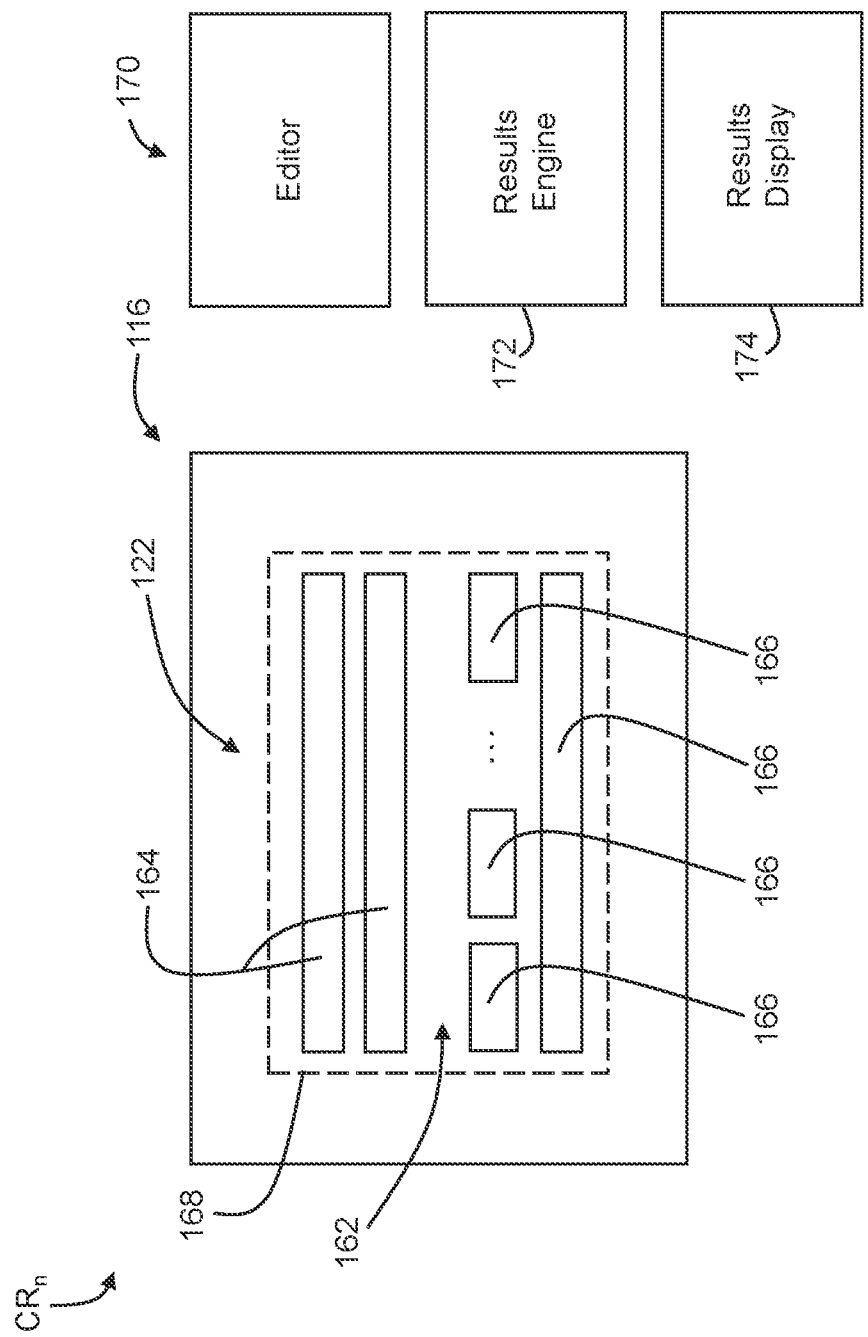
FIG. 23 shows aspects of an online broadcasting control room according to exemplary embodiments hereof.
Figure 24:
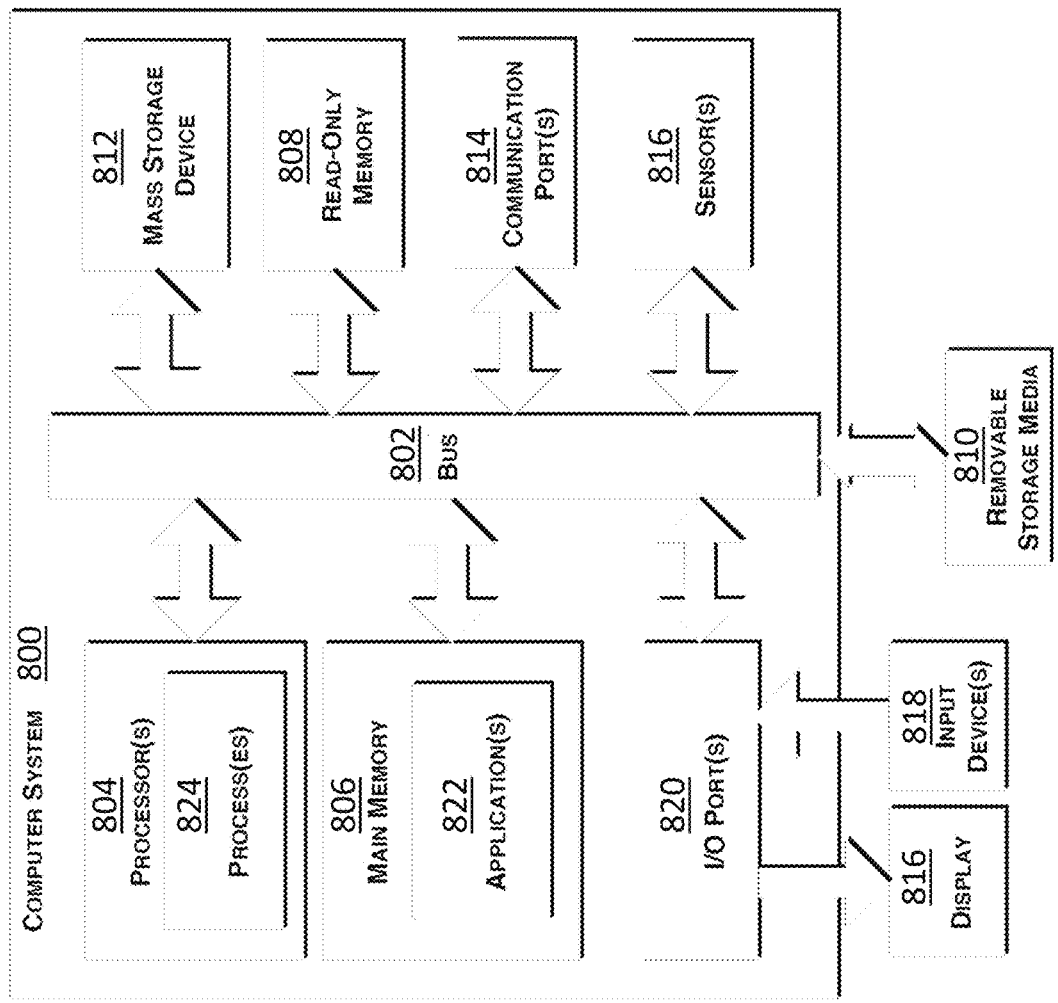
FIG. 24 shows aspects of a computing system according to exemplary embodiments hereof.

In some embodiments as shown in FIG. 23, the system 10 includes one or more interactive areas 162 within and/or overlaid the main viewing pane 122 of the video player 116 in the control room CRn. The interactive area(s) 162 and the content it may provide is preferably displayed simultaneously to (and on top of) any media content that the system 10 may provide to the main viewing pane 122, to the additional viewing panes 148, etc. In this way, a user Un may view the content playing within the main viewing pane 122, the additional viewing panes 148, and the interactive area 162 at the same time as desired.

In some embodiments, an owner Uo of a particular control room CRn may direct the system 10 to present display elements 164 (e.g., media content) within the interactive area 162 that the users Un may view (and interact with). For example, an owner Uo may direct the system 10 to present display elements 164 comprising a series of textual messages and/or questions onto the interactive area 162 that the users Un may read. Other types of display elements 164 also may be presented within the interactive area 162 by the system 10, such as, without limitation, video, graphics, animation (e.g., with or without audio), images, other types of media, and any combinations thereof.

In some embodiments, the interactive area 162 also may present interactive elements 166 adapted to receive input from the users Un as they consume the display elements 164 presented in the area 162. For example, the area 162 may present display elements 164 comprising a textual message followed by a textual question for the users Un to read and answer, and the interactive elements 166 may include multiple choice answers that the users Un may choose from in the form of radio buttons, checkboxes, dropdown menus, and/or other types of applicable interactive elements 166. In this way, the user Un may read the question and provide his/her response directly into the area 162 for the system 10 to receive and process.

In another example, an interactive element 166 may include a text field into which a user Un may type his/her answer to the question for the system 10 to read and process. In this example, the system 10 may include artificial intelligence (AI) adapted to read, interpret, and understand the users' responses, and to process the responses accordingly.

It is understood that the system 10 may identify each user Un who may be viewing the display elements 164 and/or interacting with the interactive elements 166 so that the display elements 164 may be customized (e.g., by the owner Uo) for each particular user Un (or group of users Un), and so that the system 10 may identify the particular user Un responsible for each particular interaction with each interactive element 166. This may be accomplished by registering each user Un, by tracking what control room CRn each user Un may be following, or by other means.

In some embodiments as shown in FIG. 23, the interactive area 162 includes a perimeter 168 within which the system 10 presents the display elements 164 and/or the interactive elements 166. The background within the perimeter 168 may be transparent, opaque, solid, textured, may include an image, and/or may be presented in any suitable way for the display elements 168 and the interactive elements 168 to be easily read and consumed. The perimeter 168 may include any suitable shape (e.g., rectangular), size, or form, and may be located within the main viewing pane 122 in any suitable location (e.g., in the middle). It also is contemplated that the additional viewing panes 148 also may include interactive areas 162 with display elements 164 and/or interactive elements 166.

In some embodiments as shown in FIG. 23, the system 10 includes an editor 170 preferably located in the control room CRn that the owner Uo may utilize to create, organize, deliver, and otherwise manage the display elements 164 and/or the interactive elements 166 to be provided within the interactive area 162. For example, the editor 170 may include tools enabling the owner Uo to enter display elements 164 in the form of textual content (text fields) that the system 10 will display within the interactive area 162. The editor 170 also may include tools that enable an owner Uo to classify a display element 164 as a question, and to then add interactive elements 166 as multiple choice answers that the system 10 may display and use to receive the user's input (e.g., the users' answer(s) to the questions). The editor 170 preferable enables the owner Uo to create any type of display element 164 and/or interactive element 166 combinations. In addition, when an interactive element 166 may include a text field adapted to receive an input from a user Un, the editor 170 may enable the owner Uo to input keywords, subjects, topics, and/or other types of information that the AI of the system 10 may use when interpreting and processing the textual inputs.

Expanding on this example, the editor 170 may enable the user to layer multiple display elements 164 and/or interactive elements 166 that the system 10 may provide to the users sequentially within the interactive area 162. For example, an owner Uo may use the editor 170 to create a first textual message, a first textual question, and a first set of multiple choice answers associated with the first textual question, a second textual message, a second textual question, and a second set of multiple choice answers associated with the second textual question. Additional messages, questions, and answers also may be added. Then, the system 10 may present the first message, first question, and first multiple choice answers to the user Un, and the user Un may read and answer the first question. Next, the system 10 may present the second message, second question, and second set of multiple choice answers to the user Un, and the user Un may read and answer the second questions. It can be seen that this process may continue for as many messages, questions, and/or answers as the owner Uo may desire.

It also is understood that while this example describes textual messages, textual questions, and multiple choice answers, the owner Uo may use the editor 170 to input any types of display elements 164 and/or interactive elements 166 that the system 10 may deliver sequentially as the user Un interacts with the elements 164, 166. It also is contemplated that the owner Uo may create display elements 164 and/or interactive elements 166 that may be delivered in a non-linear fashion (e.g., using decision trees (e.g., Boolean logic) wherein a particular answer (or any input) received from a particular user Un may cause a particular next display element 164 and/or a particular next interactive element 166 to be presented, based at least in part on the prior response(s) received by the user Un).

In some embodiments, an owner Uo may use the editor 170 to schedule the automatic delivery of any display elements 164 and/or any interactive elements 166 relative to the time of day, the day of the week, (e.g., during a particular class at a particular time and day), etc. In other embodiments, the owner Uo may schedule any elements 164, 166 to be delivered at a particular play time during the playing of particular media content (e.g., a particular AVODn) during a particular session. For example, a particular element 164, 166 may be scheduled to be displayed after a user Un has viewed a specific amount of a video playing within the main viewing pane 122 (e.g., at 3 minutes and 30 seconds into the video a particular question and possible answers may be displayed). In this example, the video playing in the main viewing pane 122 may be caused to pause while the user Un interacts with the elements 164, 166 in the interactive area 162, however, this may not be necessary.

In some embodiments, an owner Uo may use the editor 170 to deliver a first set of particular display elements 164 and/or interactive elements 166 to a first user Un and/or first group of users Un, and a different set of different display elements 164 and/or different interactive elements 166 to a second user Un and/or a second group of users Un. The owner Uo also may mix and match any of the elements 164, 166 to any user Un and/or groups of users Un.

In some embodiments as shown in FIG. 23, the system 10 includes a results engine 172 that processes the received inputs from the users Un via the interactive elements 166. For example, in some embodiments, the results engine 172 may determine which questions were answered correctly and which questions were answered incorrectly by any particular user Un. The engine 172 also may calculate an overall score for each user Un that particulates in a particular session of elements 164, 166 (e.g., what percentage of questions were answered correctly by each particular user Un). In another example, the results engine 172 may perform statistical analysis on the inputs received by the users Un to show statistical data for a particular session for a particular user Un, a particular group (or subgroup) of users Un, etc. In this way, the results engine 172 may calculate any desired statistical data for any individual user Un and/or across any groups or subgroups of users Un (e.g., for different classes of students).

In some embodiments as shown in FIG. 23, the results engine 172 may provide the results of its calculations to the owner Uo in a results display 174 within the control room CRn (e.g., as discreet data, as tabular data, charts, graphs, etc.). The results display 174 also may provide for the downloading and/or the sharing of the information however desired. In some embodiments, the owner Uo also may set the results engine 172 to present the results to each particular user Un individually (e.g., each user's results are shown to him/her only), and/or to each group or subgroup of users Un via the interactive area 162 or otherwise, as appropriate.

It is understood that any of the display elements 164, the interactive elements 166, and any results from the results engine 172 may be provided and/or otherwise made available (e.g., within a control room CRn) to any user Un (registered or not registered with the system 10, following a particular owner Uo and an associated control room CRn or not, etc.), any friend of any user Un within the system 10, any group of users Un, any subgroup of users Un, any other types of users Un, and any combination thereof.

It is understood that any aspect and/or element of any embodiment of the system 10 described herein or otherwise may be combined with any other aspect and/or element of any other embodiment of the system 10 to form additional embodiments of the system 10 all of which are within the scope of the system 10.

The functionalities, applications, services, mechanisms, operations, and acts shown and described above are implemented, at least in part, by software running on one or more computers (e.g., the cloud platform 100, backend systems 300, 400, 500, 600, user devices 200, etc.).

Programs that implement such methods (as well as other types of data) may be stored and transmitted using a variety of media (e.g., computer readable media) in a number of manners. Hard-wired circuitry or custom hardware may be used in place of, or in combination with, some or all of the software instructions that can implement the processes of various embodiments. Thus, various combinations of hardware and software may be used instead of software only.

One of ordinary skill in the art will readily appreciate and understand, upon reading this description, that the various processes described herein may be implemented by, e.g., appropriately programmed computers, special purpose computers and computing devices. One or more such computers or computing devices may be referred to as a computer system.

FIG. 20 is a schematic diagram of a computer system 800 upon which embodiments of the present disclosure may be implemented and carried out.

According to the present example, the computer system 800 includes a bus 802 (i.e., interconnect), one or more processors 804, a main memory 806, read-only memory 808, removable storage media 810, mass storage 812, and one or more communications ports 814. Communication port(s) 814 may be connected to one or more networks (not shown) by way of which the computer system 800 may receive and/or transmit data.

As used herein, a "processor" means one or more microprocessors, central processing units (CPUs), computing devices, microcontrollers, digital signal processors, or like devices or any combination thereof, regardless of their architecture. An apparatus that performs a process can include, e.g., a processor and those devices such as input devices and output devices that are appropriate to perform the process.

Processor(s) 804 can be any known processor, such as, but not limited to, an Intel® Itanium® or Itanium 2® processor(s), AMD® Opteron® or Athlon MP® processor(s), or Motorola® lines of processors, and the like. Communications port(s) 814 can be any of an Ethernet port, a Gigabit port using copper or fiber, or a USB port, and the like. Communications port(s) 814 may be chosen depending on a network such as a Local Area Network (LAN), a Wide Area Network (WAN), or any network to which the computer system 800 connects. The computer system 800 may be in communication with peripheral devices (e.g., display screen 816, input device(s) 818) via Input/Output (I/O) port 820.

Main memory 806 can be Random Access Memory (RAM), or any other dynamic storage device(s) commonly known in the art. Read-only memory (ROM) 808 can be any static storage device(s) such as Programmable Read-Only Memory (PROM) chips for storing static information such as instructions for processor(s) 804. Mass storage 812 can be used to store information and instructions. For example, hard disk drives, an optical disc, an array of disks such as Redundant Array of Independent Disks (RAID), or any other mass storage devices may be used.

Bus 802 communicatively couples processor(s) 804 with the other memory, storage and communications blocks. Bus 802 can be a PCI/PCI-X, SCSI, a Universal Serial Bus (USB) based system bus (or other) depending on the storage devices used, and the like. Removable storage media 810 can be any kind of external storage, including hard-drives, floppy drives, USB drives, Compact Disc-Read Only Memory (CD-ROM), Compact Disc-Re-Writable (CD-RW), Digital Versatile Disk-Read Only Memory (DVD-ROM), etc.

Embodiments herein may be provided as one or more computer program products, which may include a machine-readable medium having stored thereon instructions, which may be used to program a computer (or other electronic devices) to perform a process. As used herein, the term "machine-readable medium" refers to any medium, a plurality of the same, or a combination of different media, which participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory, which typically constitutes the main memory of the computer. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications.

The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols; and/or (iv) encrypted in any of a variety of ways well known in the art.

A computer-readable medium can store (in any appropriate format) those program elements which are appropriate to perform the methods.

As shown, main memory 806 is encoded with application(s) 822 that support(s) the functionality as discussed herein (the application(s) 822 may be an application(s) that provides some or all of the functionality of the services/mechanisms described herein. Application(s) 822 (and/or other resources as described herein) can be embodied as software code such as data and/or logic instructions (e.g., code stored in the memory or on another computer readable medium such as a disk) that supports processing functionality according to different embodiments described herein.

During operation of one embodiment, processor(s) 804 accesses main memory 806 via the use of bus 802 in order to launch, run, execute, interpret or otherwise perform the logic instructions of the application(s) 822. Execution of application(s) 822 produces processing functionality of the service related to the application(s). In other words, the process(es) 824 represent one or more portions of the application(s) 822 performing within or upon the processor(s) 804 in the computer system 800.

It should be noted that, in addition to the process(es) 824 that carries (carry) out operations as discussed herein, other embodiments herein include the application 822 itself (i.e., the un-executed or non-performing logic instructions and/or data). The application 822 may be stored on a computer readable medium (e.g., a repository) such as a disk or in an optical medium. According to other embodiments, the application 822 can also be stored in a memory type system such as in firmware, read only memory (ROM), or, as in this example, as executable code within the main memory 806 (e.g., within Random Access Memory or RAM). For example, application(s) 822 may also be stored in removable storage media 810, read-only memory 808, and/or mass storage device 812.

Those of ordinary skill in the art will understand that the computer system 800 can include other processes and/or software and hardware components, such as an operating system that controls allocation and use of hardware resources.

As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware. The term "module" refers to a self-contained functional component, which can include hardware, software, firmware or any combination thereof.

One of ordinary skill in the art will readily appreciate and Understand, upon reading this description, that embodiments of an apparatus may include a computer/computing device operable to perform some (but not necessarily all) of the described process.

Embodiments of a computer-readable medium storing a program or data structure include a computer-readable medium storing a program that, when executed, can cause a processor to perform some (but not necessarily all) of the described process.

Where a process is described herein, those of ordinary skill in the art will appreciate that the process may operate without any user intervention. In another embodiment, the process includes some human intervention (e.g., a step is performed by or with the assistance of a human).

As used herein, including in the claims, the phrase "at least some" means "one or more," and includes the case of only one. Thus, e.g., the phrase "at least some ABCs" means "one or more ABCs", and includes the case of only one ABC.

As used herein, including in the claims, term "at least one" should be Understood as meaning "one or more", and therefore includes both embodiments that include one or multiple components. Furthermore, dependent claims that refer to independent claims that describe features with "at least one" have the same meaning, both when the feature is referred to as "the" and "the at least one".

As used in this description, the term "portion" means some or all. So, for example, "A portion of X" may include some of "X" or all of "X". In the context of a conversation, the term "portion" means some or all of the conversation.

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

In general, as used herein, including in the claims, Unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

It should be appreciated that the words "first," "second," and so on, in the description and claims, are used to distinguish or identify, and not to show a serial or numerical limitation. Similarly, letter labels (e.g., "(A)", "(B)", "(C)", and so on, or "(a)", "(b)", and so on) and/or numbers (e.g., "(i)", "(ii)", and so on) are used to assist in readability and to help distinguish and/or identify, and are not intended to be otherwise limiting or to impose or imply any serial or numerical limitations or orderings. Similarly, words such as "particular," "specific," "certain," and "given," in the description and claims, if used, are to distinguish or identify, and are not intended to be otherwise limiting.

As used herein, including in the claims, the terms "multiple" and "plurality" mean "two or more," and include the case of "two." Thus, e.g., the phrase "multiple ABCs," means "two or more ABCs," and includes "two ABCs." Similarly, e.g., the phrase "multiple PQRs," means "two or more PQRs," and includes "two PQRs."

The present invention also covers the exact terms, features, values and ranges, etc. in case these terms, features, values and ranges etc. are used in conjunction with terms such as about, around, generally, substantially, essentially, at least etc. (i.e., "about 3" or "approximately 3" shall also cover exactly 3 or "substantially constant" shall also cover exactly constant).

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components unless specifically so stated.

It will be appreciated that variations to the embodiments of the invention can be made while still falling within the scope of the invention. Alternative features serving the same, equivalent or similar purpose can replace features disclosed in the specification, unless stated otherwise. Thus, unless stated otherwise, each feature disclosed represents one example of a generic series of equivalent or similar features.

The present invention also covers the exact terms, features, values and ranges, etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

Use of exemplary language, such as "for instance", "such as", "for example" ("e.g.,") and the like, is merely intended to better illustrate the invention and does not indicate a limitation on the scope of the invention unless specifically so claimed.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

The invention claimed is:

1. A non-transitory computer readable medium, having stored thereon, instructions that when executed by a computing device, cause the computing device to perform operations for broadcasting media in a broadcasting system comprising a media stream combiner configured with at least one server, the operations comprising:
    (A) providing at a first client device associated with a first user, a first graphical user interface including a first primary video player and at least one live stream video player including a video viewing pane with a video viewing pane size defined by a video viewing pane perimeter and one or more live stream video viewing pane selectable areas within the video viewing pane perimeter, each of the one or more live stream video viewing pane selectable areas including a corresponding selectable area size that is less than the video viewing pane size and that is selectable as an individual user interface element;
    (B) providing at a second client device associated with a second user, a second graphical user interface including a second primary video player including a second primary video player pane and at least one additional video player pane overlaid the second primary video player pane;
    (C) providing to a first at least one live stream video player a first live stream video;
    (D) by the broadcasting system, receiving an indication of a selection of a first one or more live stream video player selectable area of the first at least one live stream video player;
    (E) by the broadcasting system, when the indication of the selection of the first one or more live stream video player selectable area of the first at least one live stream video player is received:
        (F) identifying the first live stream video; and
        (G) providing at a first at least one additional video player pane, the first live stream video identified in (F).

2. The non-transitory computer readable medium of claim 1, the operations further comprising:
    (H) providing to a second at least one live stream video player a second live stream video;
    (I) by the broadcasting system, receiving an indication of a selection of a first one or more live stream video viewing pane selectable area of the second at least one live stream video player;
    (J) by the broadcasting system, when the indication of the selection of the first one or more live stream video viewing pane selectable area of the second at least one live stream video player is received:
        (K) identifying the second live stream video; and
        (L) providing at a second at least one additional video player pane, the second live stream video identified in (K).

3. The non-transitory computer readable medium of claim 1, further comprising:
    (D)(1) by the broadcasting system, receiving an indication of a selection of a second one or more live stream video viewing pane selectable area of the first at least one live stream video player;
    (E)(1) by the broadcasting system, when the indication of the selection of the second one or more live stream video viewing pane selectable area of the first at least one live stream video player is received:
        (G)(1) providing at a second at least one additional video player pane, the first live stream video identified in (F).

4. The non-transitory computer readable medium of claim 1 wherein a location of the one or more live stream video viewing pane selectable areas within the video viewing pane perimeter is chosen by the first user and/or by the second user.

5. A non-transitory computer readable medium, having stored thereon, instructions that when executed by a computing device, cause the computing device to perform operations for broadcasting media in a broadcasting system comprising a media stream combiner configured with at least one server, the operations comprising:
    (A) providing at a first client device associated with a first user, a first graphical user interface including a first primary video player and at least one video on demand player including one or more video on demand player selectable areas each selectable as an individual user interface element;
    (B) providing at a second client device associated with a second user, a second graphical user interface including a second primary video player including a second primary video player pane and at least one additional video player pane overlaid the second primary video player pane;
    (C) providing to a first at least video on demand player a first video on demand video;
    (D) by the broadcasting system, receiving an indication of a selection of a first one or more video on demand player selectable area of the first at least one video on demand player;
    (E) by the broadcasting system, when the indication of the selection of the first one or more video on demand player selectable area of the first at least one video on demand player is received:
        (F) identifying the first video on demand video; and
        (G) providing at a first at least one additional video player pane, the first video on demand video identified in (F).

6. The non-transitory computer readable medium of claim 5, the operations further comprising:
    (H) providing to a second at least one video on demand player a second video on demand video;

(I) by the broadcasting system, receiving an indication of a selection of a first one or more video on demand player selectable area of the second at least one video on demand player;

(J) by the broadcasting system, when the indication of the selection of the first one or more video on demand player selectable area of the second at least one video on demand player is received:

(K) identifying the second video on demand video; and (L) providing at a second at least one additional video player pane, the second video on demand video identified in (K).

7. The non-transitory computer readable medium of claim 5, further comprising:

(D)(1) by the broadcasting system, receiving an indication of a selection of a second one or more video on demand player selectable area of the first at least one video on demand player;

(E)(1) by the broadcasting system, when the indication of the selection of the second one or more video on demand player selectable area of the first at least one video on demand player is received:

(G)(1) providing at a second at least one additional video player pane, the first video on demand identified in (F).

8. The non-transitory computer readable medium of claim 5 wherein a location of the one or more video on demand player selectable areas in the at least one video on demand player is chosen by the first user and/or by the second user.

9. A non-transitory computer readable medium, having stored thereon, instructions that when executed by a computing device, cause the computing device to perform operations for broadcasting media in a broadcasting system comprising a media stream combiner configured with at least one server, the operations comprising:

(A) providing at a first client device associated with a first user, a first graphical user interface including a first primary video player and at least one live stream video player including a video viewing pane with a video viewing pane size defined by a video viewing pane perimeter and two or more separate and distinct live stream video viewing pane selectable areas within the video viewing pane perimeter, each of the two or more live stream video viewing pane selectable areas including a corresponding selectable area size that is less than the video viewing pane size and that is selectable as an individual user interface element;

(B) providing at a second client device associated with a second user, a second graphical user interface including a second primary video player including a second primary video player pane and at least one additional video player pane overlaid the second primary video player pane;

(C) providing to a first at least one live stream video player a first live stream video;

(D) by the broadcasting system, receiving an indication of a selection of a first one of the two or more live stream video viewing pane selectable area of the first at least one live stream video player;

(E) by the broadcasting system, when the indication of the selection of the first one of the two or more live stream video viewing pane selectable area of the first at least one live stream video player is received:

(F) identifying the first live stream video; and (G) providing at a first at least one additional video player pane, the first live stream video identified in (F).

10. The non-transitory computer readable medium of claim 9 wherein a location of the one or more live stream video viewing pane selectable areas within the video viewing pane perimeter is chosen by the first user and/or by the second user.

* * * * *